(12) United States Patent
Mukaiya et al.

(10) Patent No.: US 6,226,130 B1
(45) Date of Patent: *May 1, 2001

(54) ZOOM LENS

(75) Inventors: Hitoshi Mukaiya; Akihisa Horiuchi, both of Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,730

(22) Filed: Apr. 1, 1997

(30) Foreign Application Priority Data

| Apr. 9, 1996 | (JP) | 8-086616 |
| Apr. 9, 1996 | (JP) | 8-086618 |
| May 14, 1996 | (JP) | 8-143685 |

(51) Int. Cl.$^7$ .................................................. G02B 15/14
(52) U.S. Cl. ........................................ 359/687; 359/683
(58) Field of Search .................................. 359/687, 683, 359/684, 676

(56) References Cited

U.S. PATENT DOCUMENTS

| Re. 32,923 | 5/1989 | Kreitzer | 350/423 |
| 4,256,381 | 3/1981 | Kreitzer | 350/423 |
| 4,299,454 | 11/1981 | Betensky | 350/427 |
| 4,770,510 | 9/1988 | Mukaiya | 350/427 |
| 4,776,679 | 10/1988 | Kitagishi et al. | 350/427 |
| 4,802,747 | 2/1989 | Horiuchi | 350/427 |
| 4,842,386 | 6/1989 | Kitagishi et al. | 350/427 |
| 4,854,684 | 8/1989 | Horiuchi | 350/427 |
| 4,859,042 | 8/1989 | Tanaka | 350/423 |
| 4,892,397 | 1/1990 | Horiuchi | 350/425 |

(List continued on next page.)

FOREIGN PATENT DOCUMENTS

| 55-62419 | 5/1980 | (JP) . |
| 56-114920 | 9/1981 | (JP) . |
| 62-24213 | 2/1987 | (JP) . |
| 62-206516 | 9/1987 | (JP) . |
| 62-215225 | 9/1987 | (JP) . |
| 3-200113 | 9/1991 | (JP) . |
| 4-26811 | 1/1992 | (JP) . |
| 4-43311 | 2/1992 | (JP) . |
| 4-88309 | 3/1992 | (JP) . |
| 4-153615 | 5/1992 | (JP) . |
| 4-242707 | 8/1992 | (JP) . |
| 4-343313 | 11/1992 | (JP) . |
| 5-19165 | 1/1993 | (JP) . |
| 5-27167 | 2/1993 | (JP) . |
| 5-60973 | 3/1993 | (JP) . |
| 5-60974 | 3/1993 | (JP) . |
| 5-72474 | 3/1993 | (JP) . |
| 5-297275 | 11/1993 | (JP) . |

(List continued on next page.)

Primary Examiner—Georgia Epps
Assistant Examiner—Jordan M. Schwartz
(74) Attorney, Agent, or Firm—Fitzpatrick, Cella, Harper & Scinto

(57) ABSTRACT

A zoom lens of the rear focus type is disclosed, whose back focal distance is increased to accommodate a three-color separation prism and other optical elements, comprising, in order from an object side to an image side, a first lens unit of positive refractive power, a second lens unit of negative refractive power, a third lens unit of positive refractive power and a fourth lens unit of positive refractive power, the second lens unit and the fourth lens unit being moved to effect zooming and the fourth lens unit being moved to effect focusing, wherein the third lens unit has a negative lens disposed closest to the object side and having a concave surface facing the object side and has a positive lens disposed closest to the image side, and a lens surface on the image side of the positive lens has a refractive power which is stronger than that of a lens surface on the object side of the positive lens.

8 Claims, 27 Drawing Sheets

U.S. PATENT DOCUMENTS

| | | | |
|---|---|---|---|
| 5,050,972 | 9/1991 | Mukaiya et al. | 359/683 |
| 5,056,900 | 10/1991 | Mukaiya et al. | 359/676 |
| 5,095,387 | 3/1992 | Horiuchi | 359/676 |
| 5,138,492 | 8/1992 | Hamano et al. | 359/684 |
| 5,189,558 | 2/1993 | Ishii et al. | 359/687 |
| 5,231,540 | 7/1993 | Shibata | 359/684 |
| 5,235,466 | 8/1993 | Ono et al. | 359/684 |
| 5,296,969 | 3/1994 | Mihara | 359/687 |
| 5,321,552 | 6/1994 | Horiuchi et al. | 359/654 |
| 5,353,157 | 10/1994 | Horiuchi | 359/676 |
| 5,396,367 | 3/1995 | Ono et al. | 359/687 |
| 5,530,592 | 6/1996 | Tochigi | 359/687 |
| 5,537,255 * | 7/1996 | Tochigi | 359/684 |
| 5,583,697 | 12/1996 | Mukaiya | 359/687 |
| 5,583,698 | 12/1996 | Yamada | 359/687 |
| 5,612,825 | 3/1997 | Horiuchi et al. | 359/687 |
| 5,638,216 | 6/1997 | Horiuchi et al. | 359/683 |
| 5,712,733 | 1/1998 | Mukaiya | 359/687 |
| 5,754,346 | 5/1998 | Nakayama et al. | 359/687 |
| 5,963,378 * | 10/1999 | Tochigi et al. | 359/687 |

FOREIGN PATENT DOCUMENTS

| | | |
|---|---|---|
| 6-51199 | 2/1994 | (JP) . |
| 6-337353 | 12/1994 | (JP) . |
| 6-347679 | 12/1994 | (JP) . |
| 7-199069 | 8/1995 | (JP) . |
| 7-270684 | 10/1995 | (JP) . |

* cited by examiner

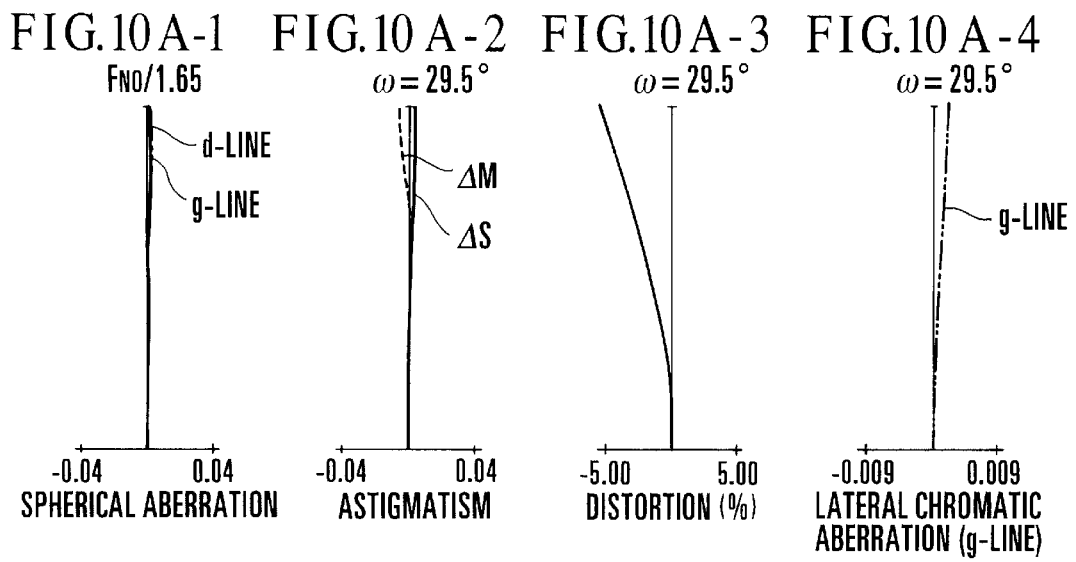
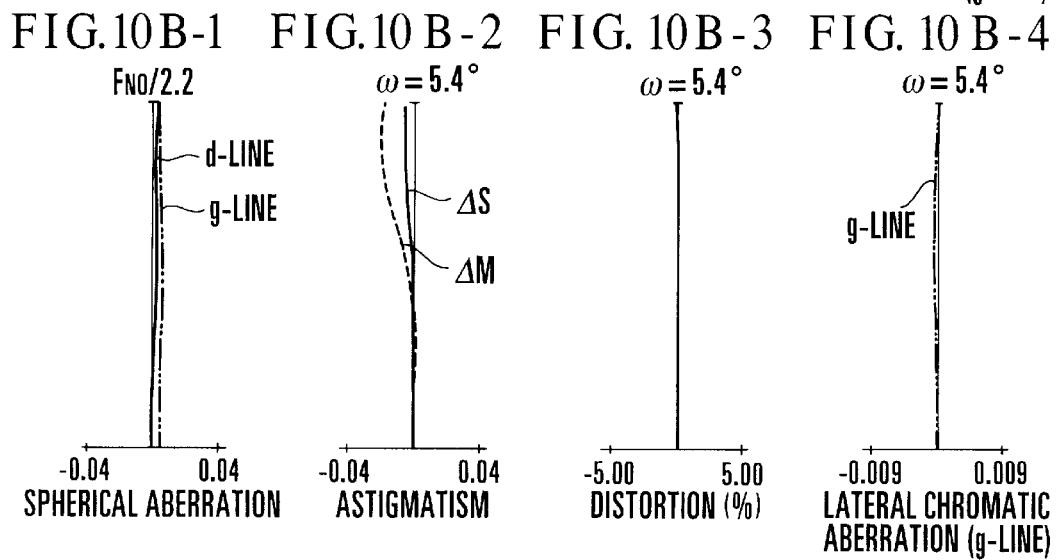
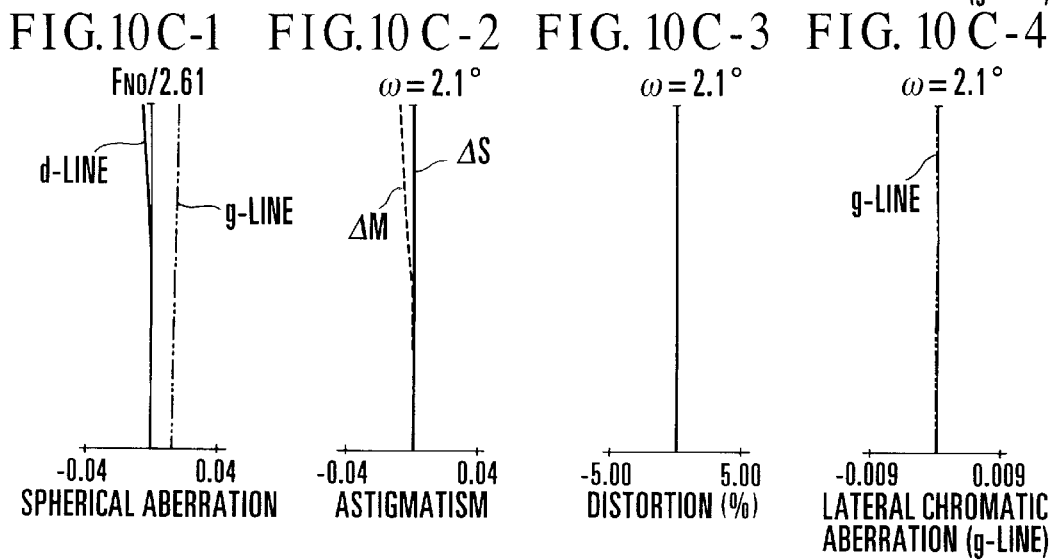

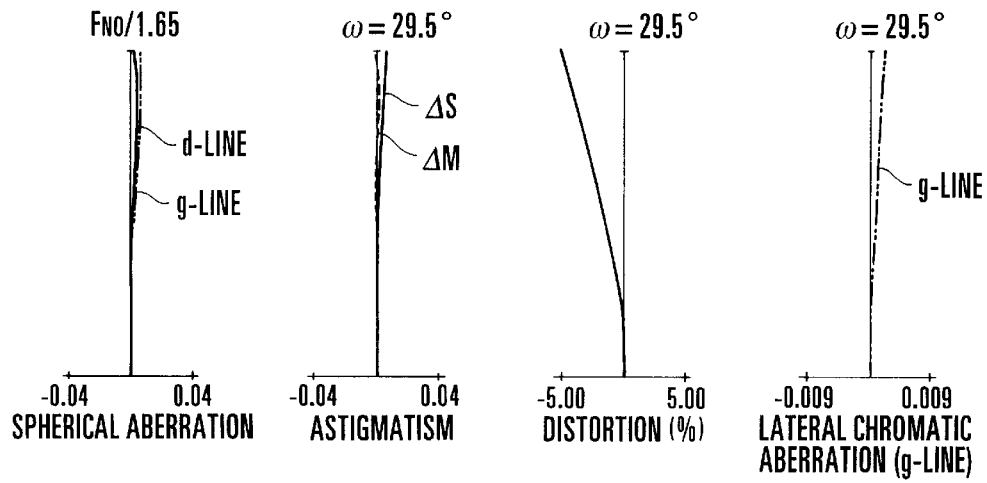
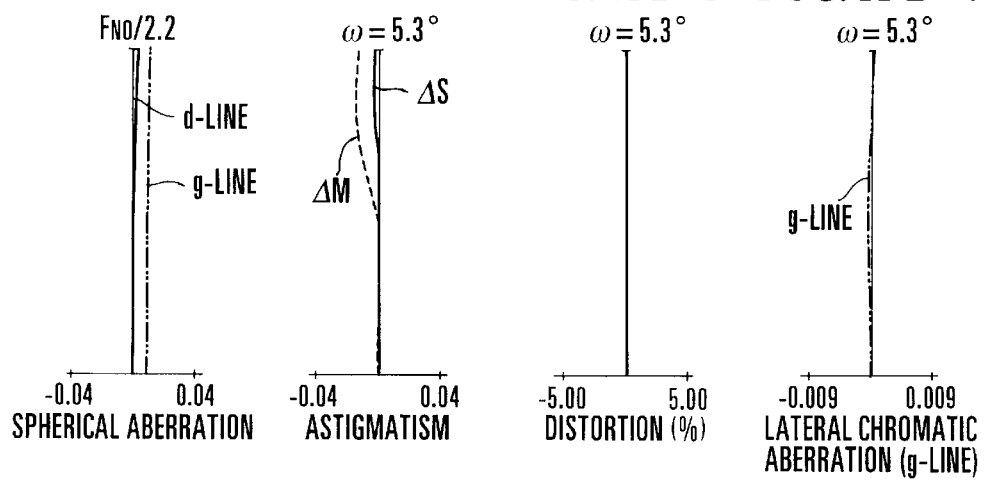
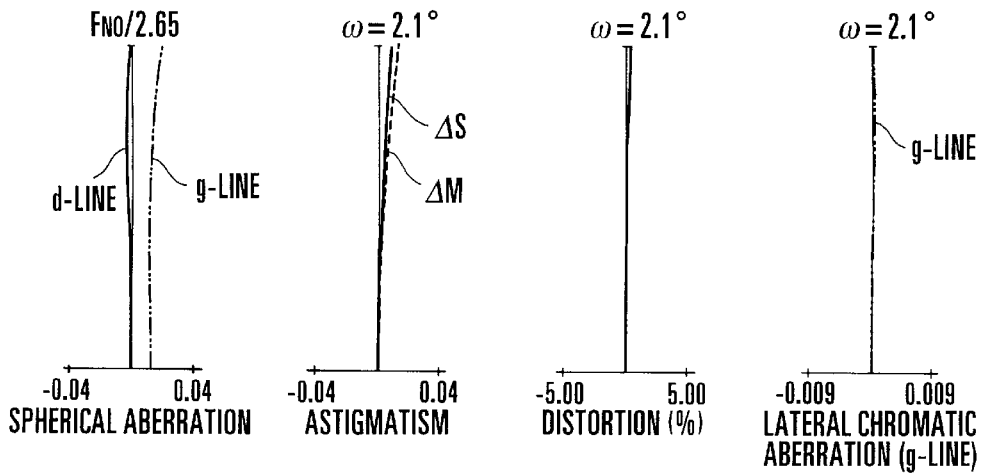

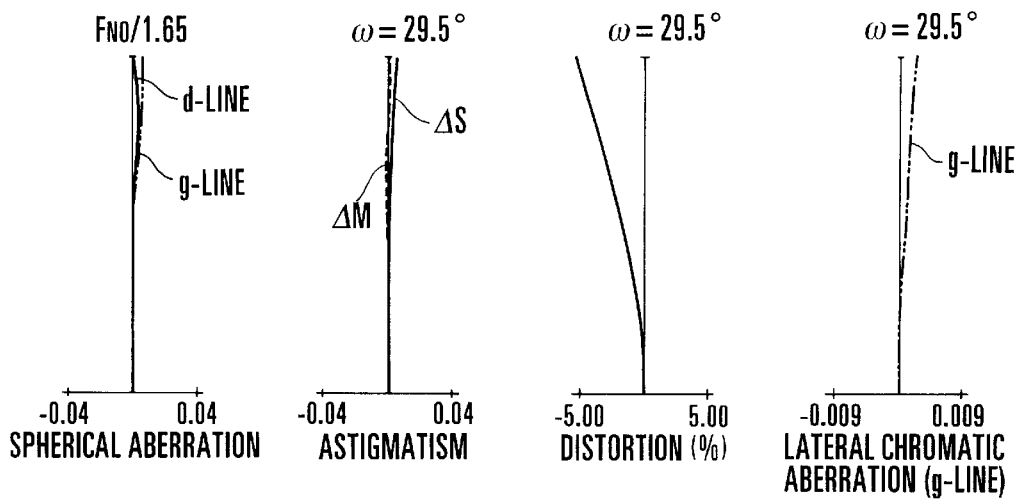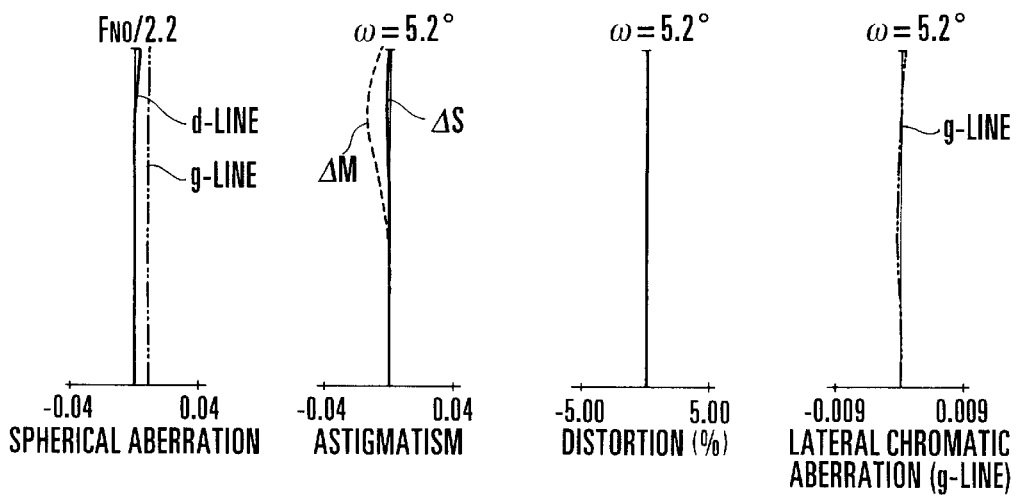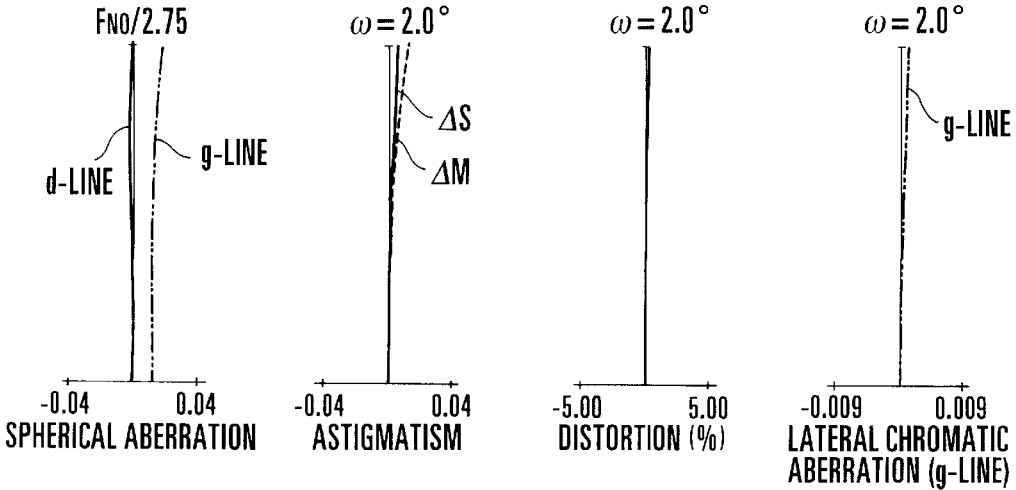

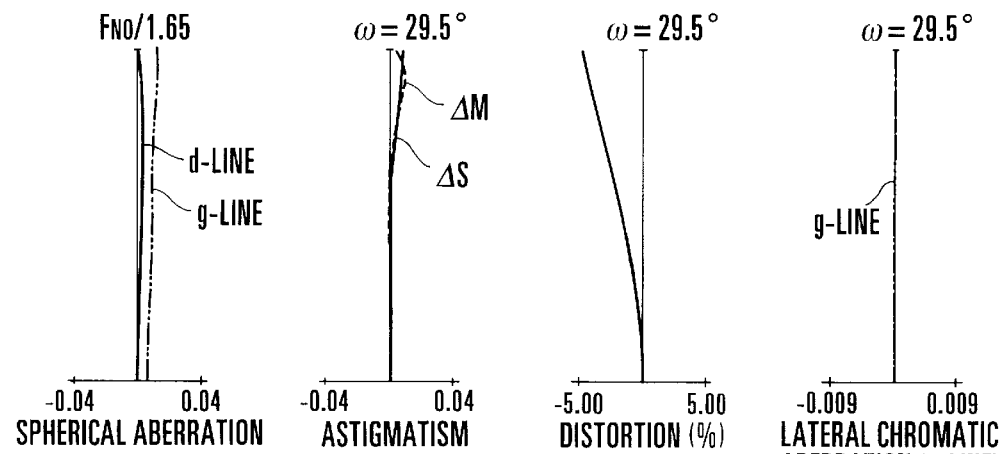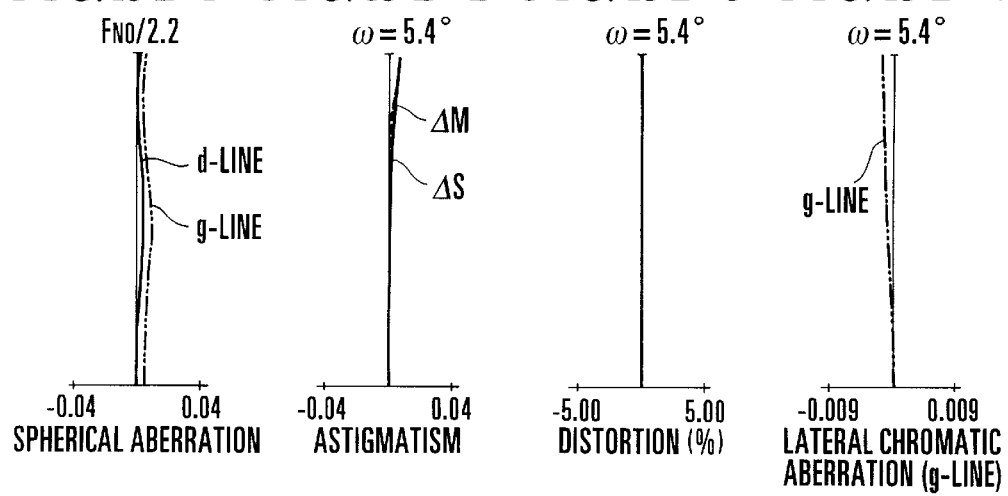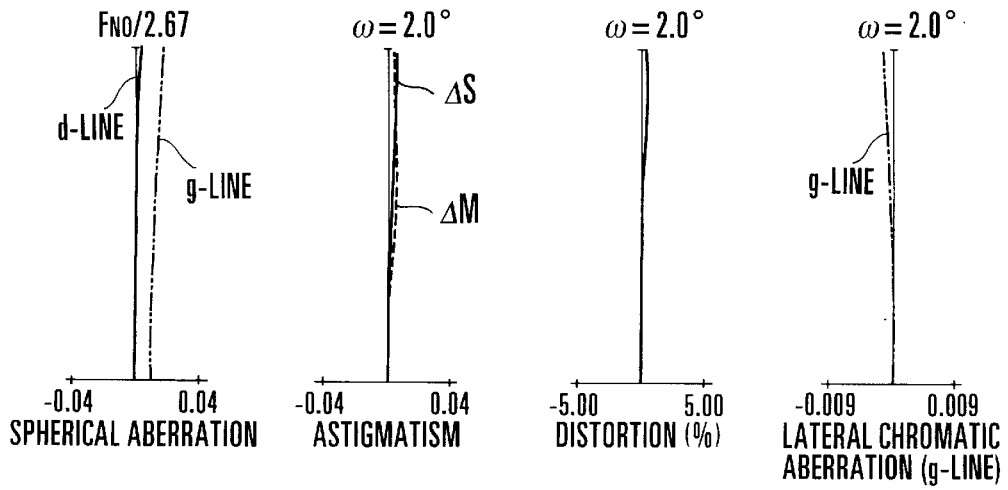

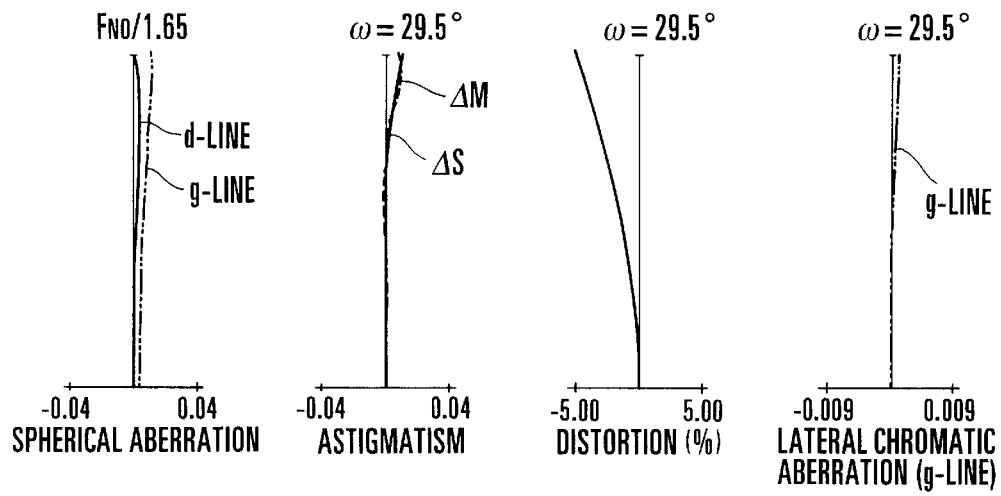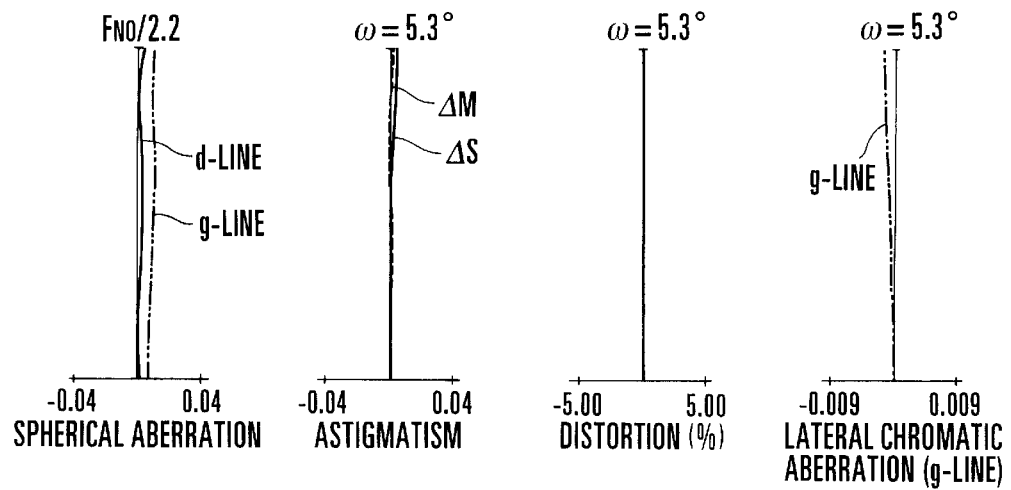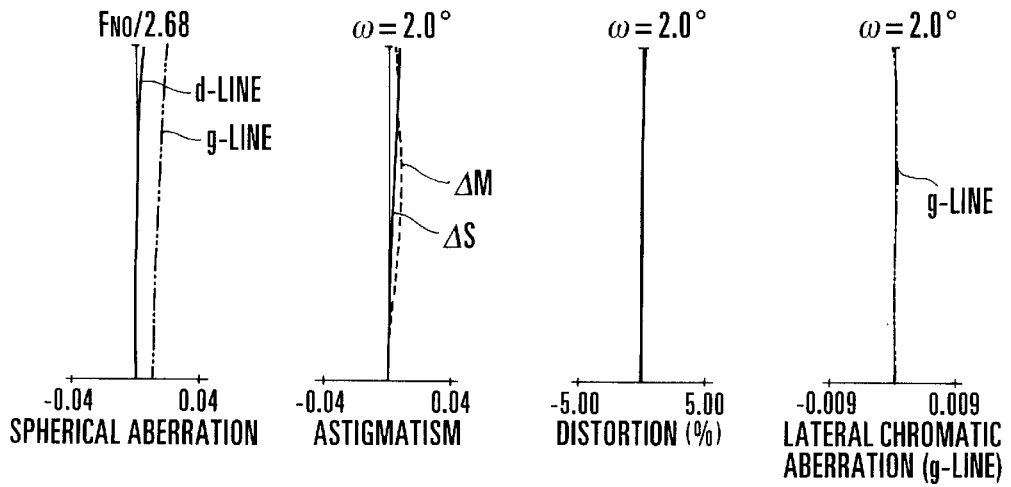

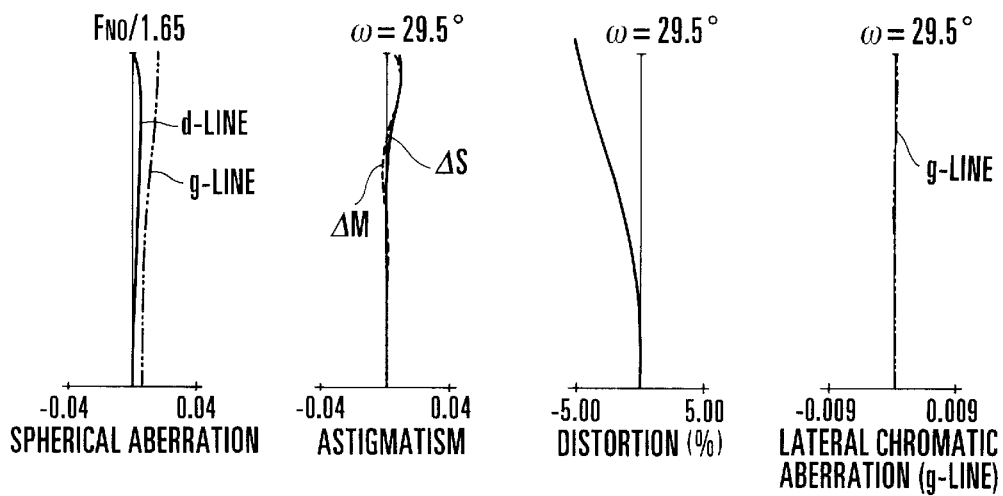
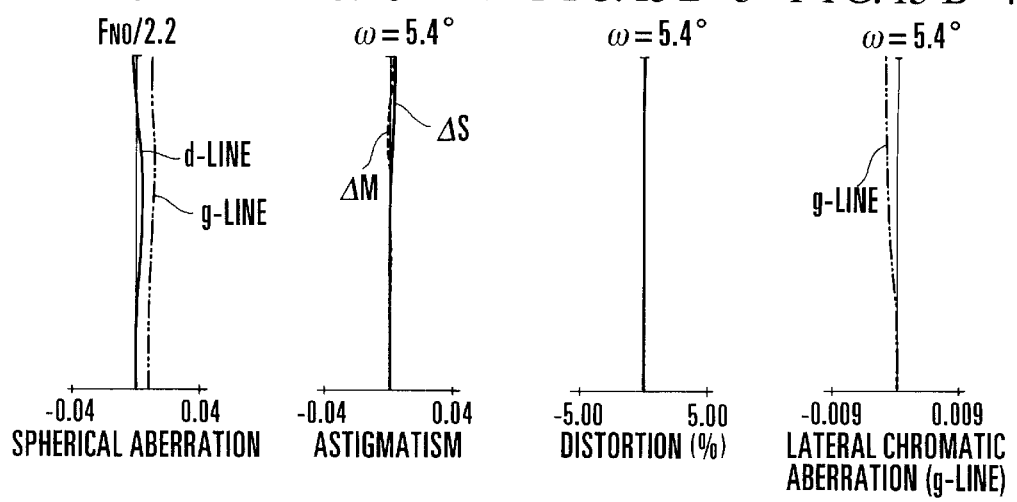
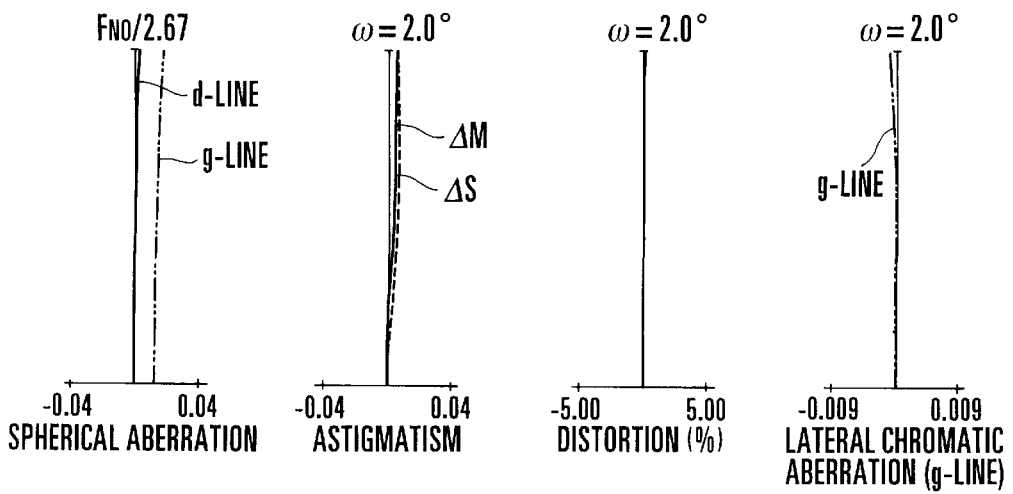

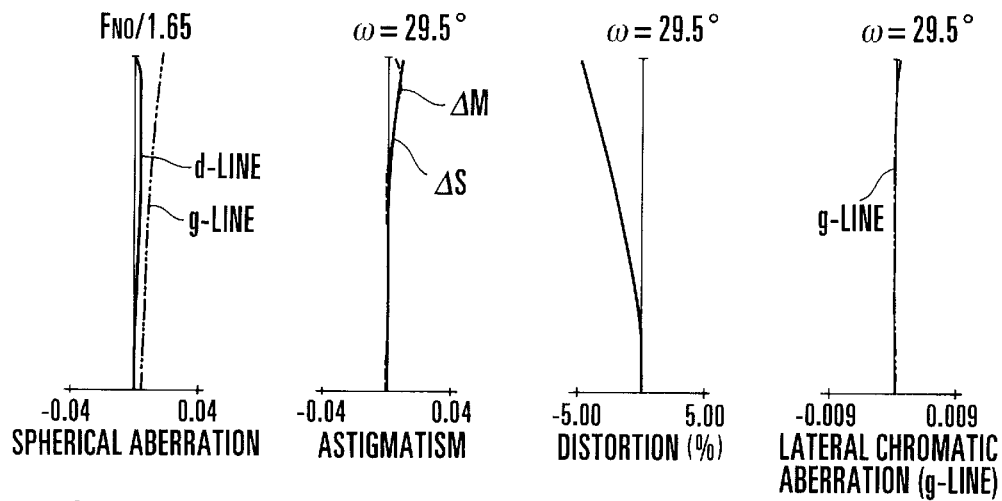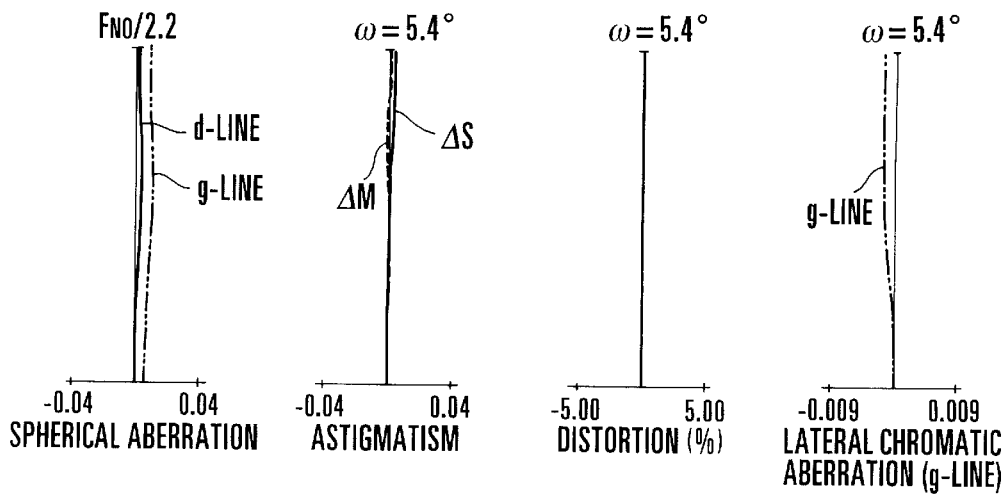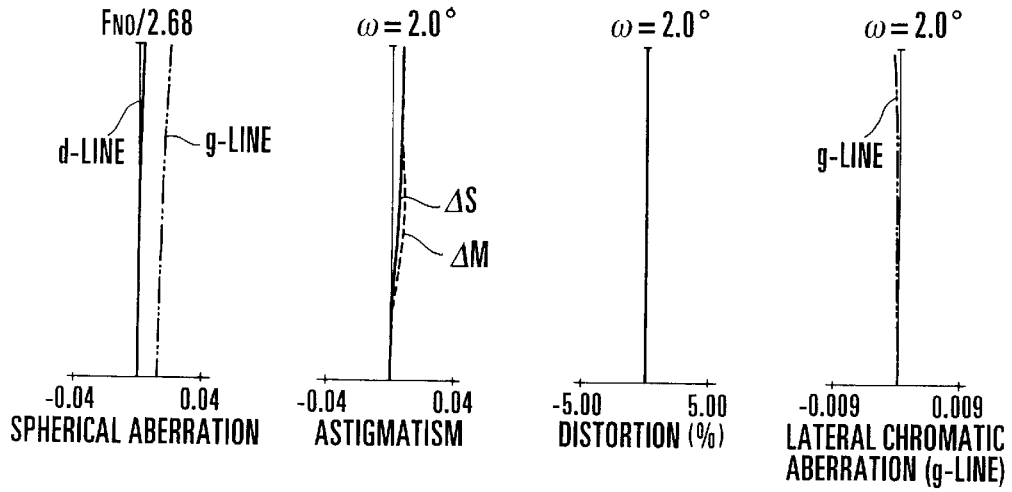

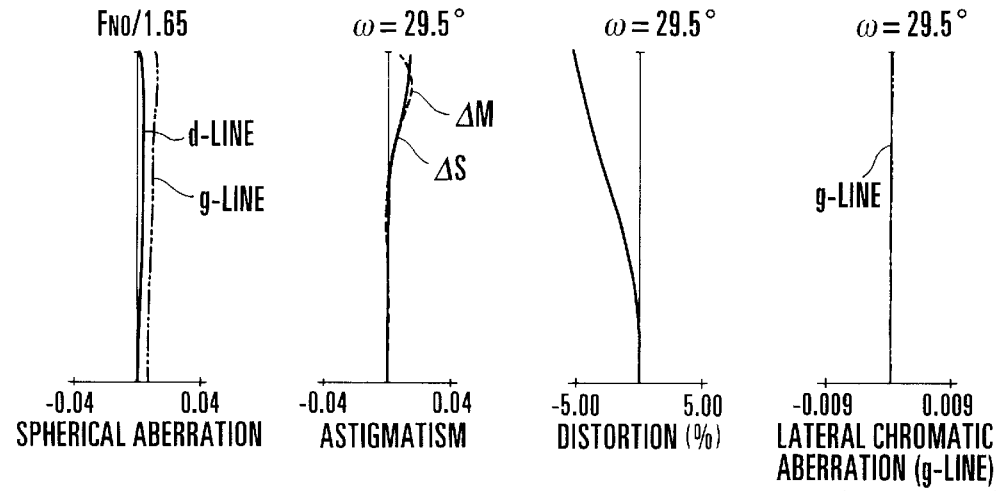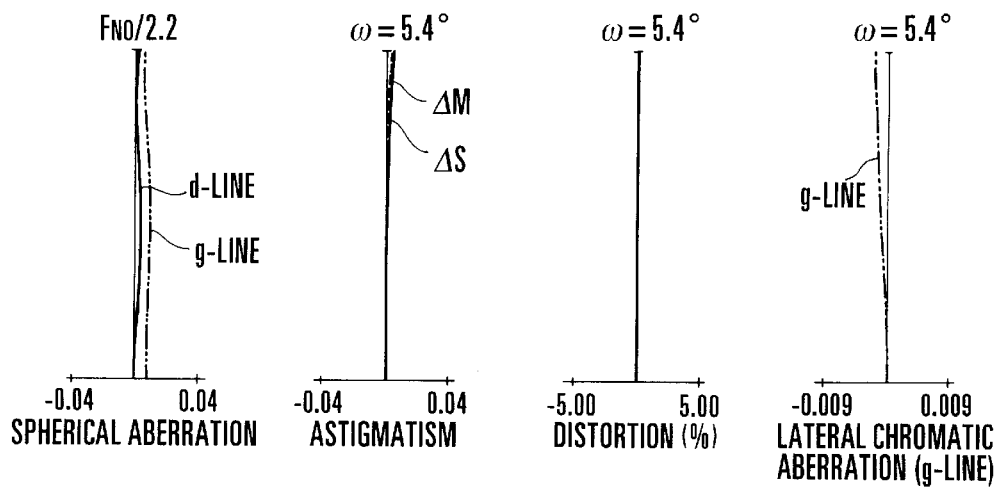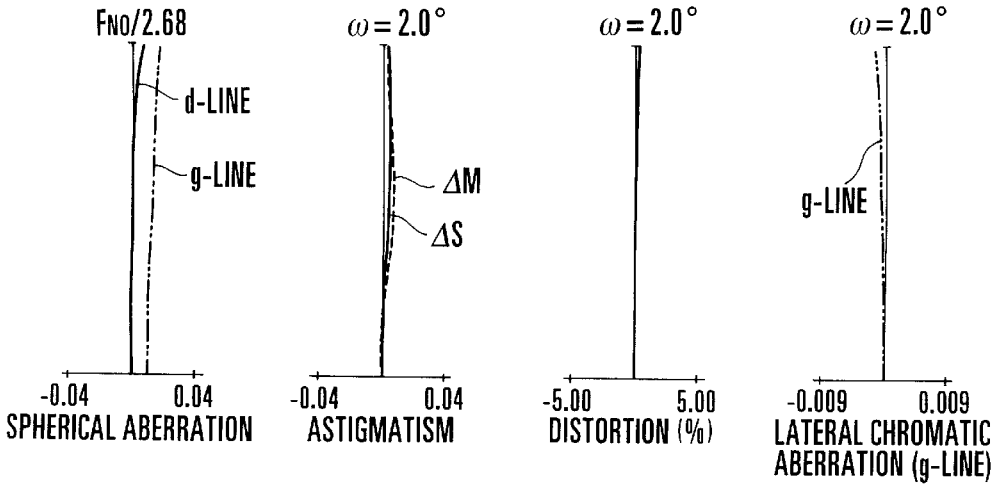

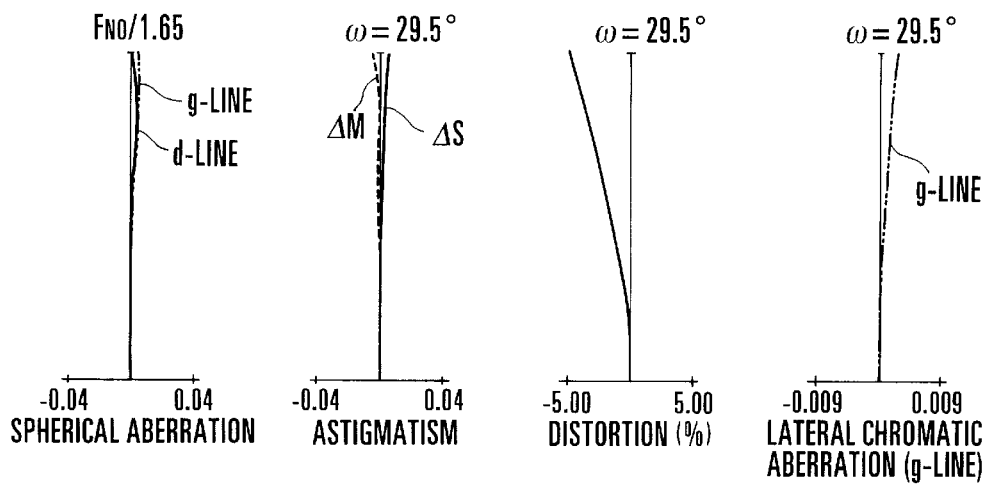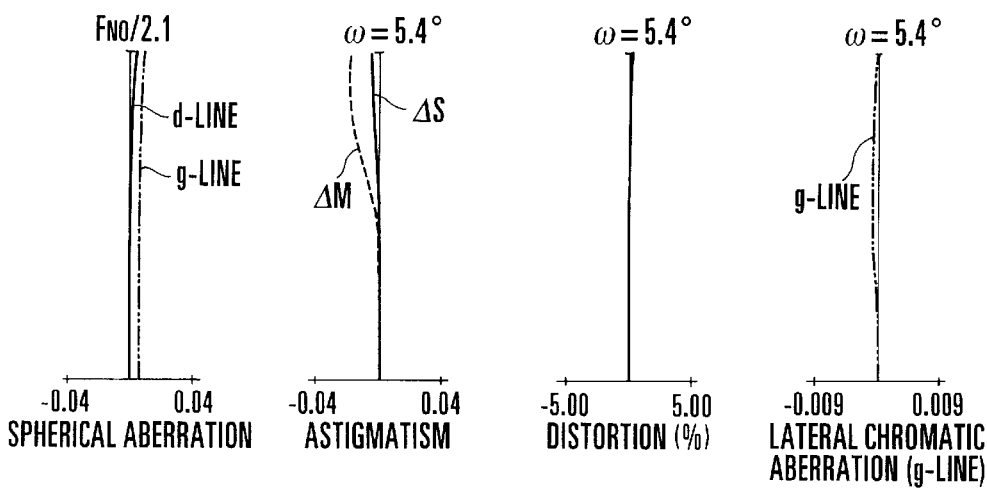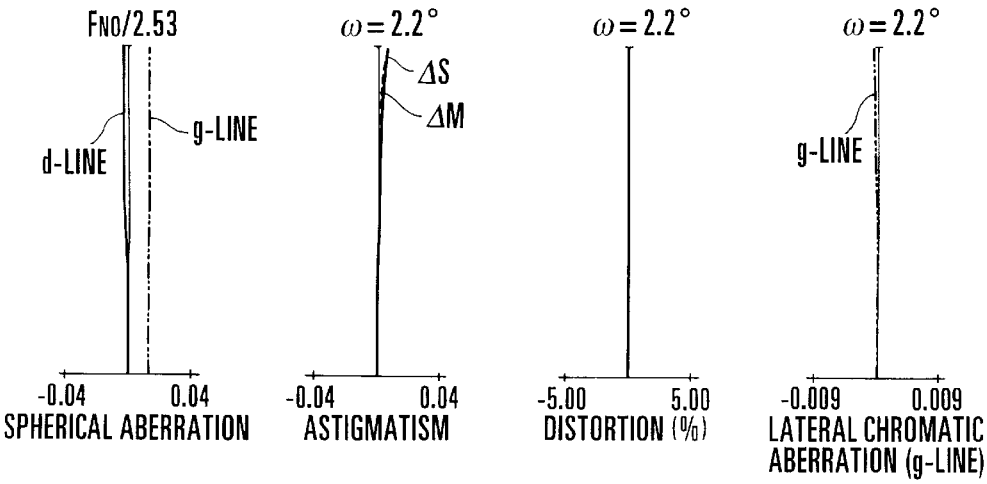

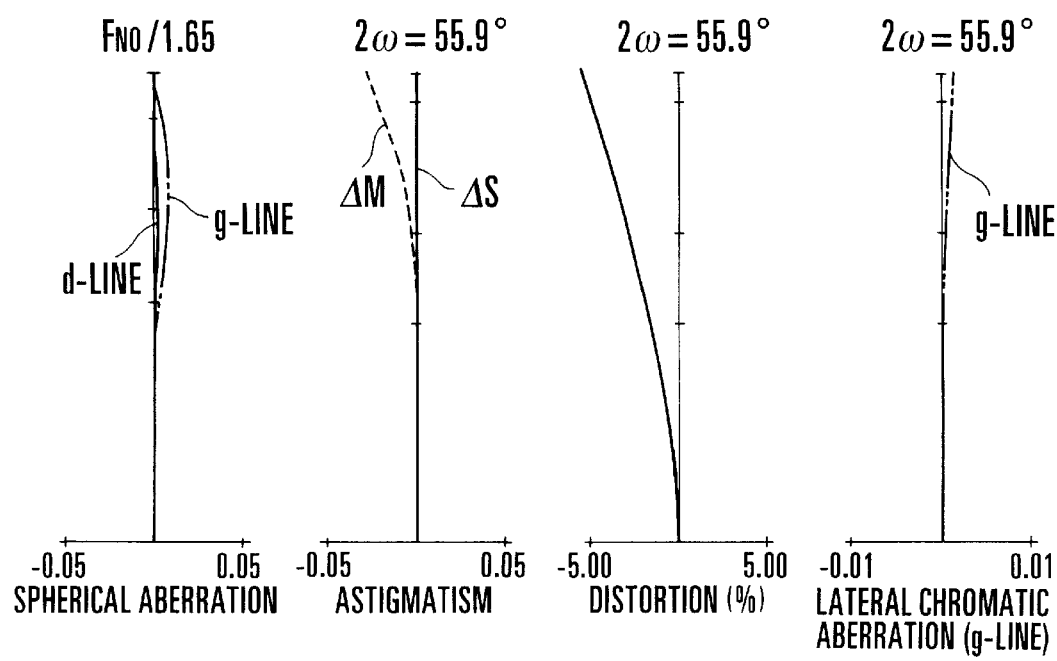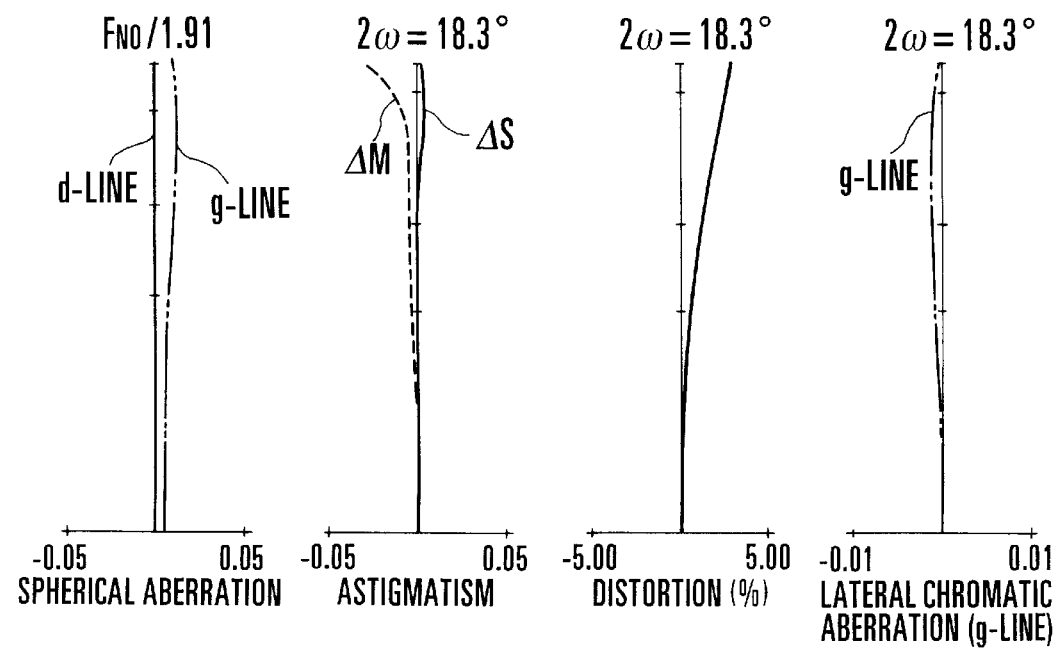

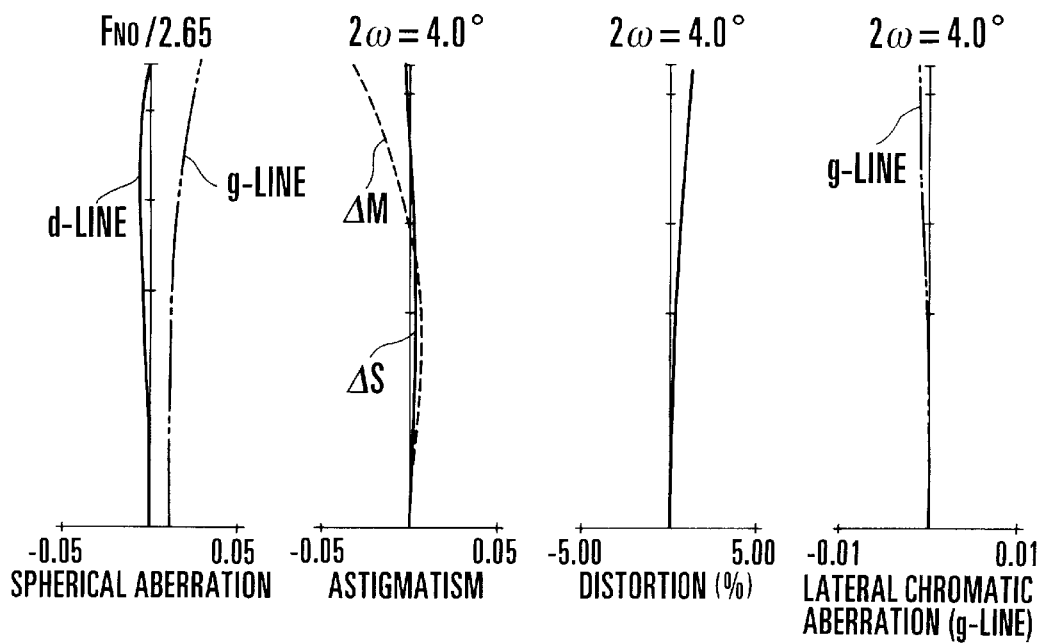
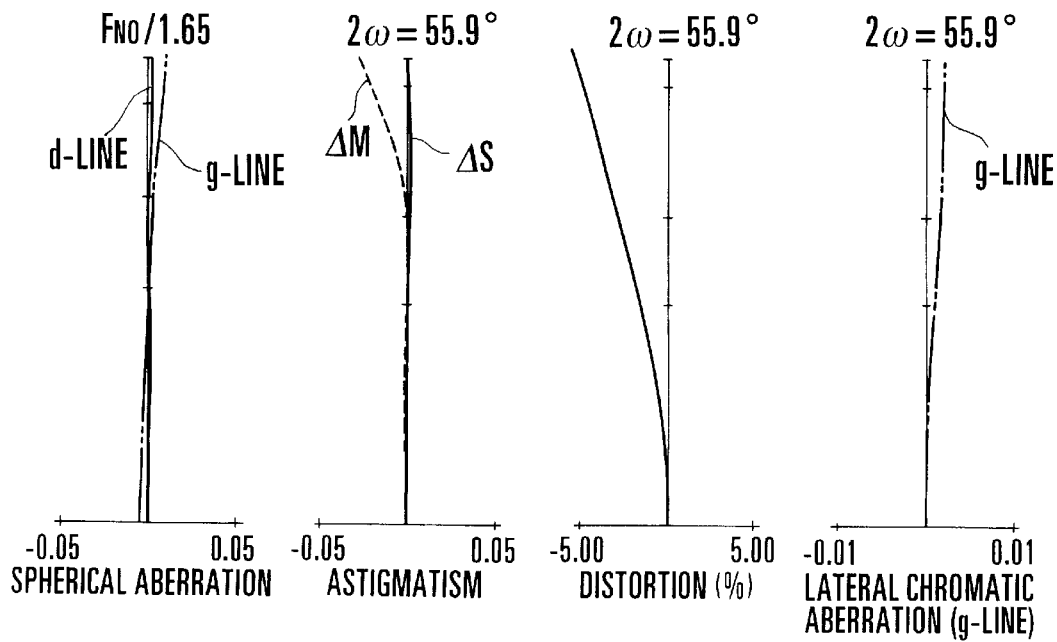

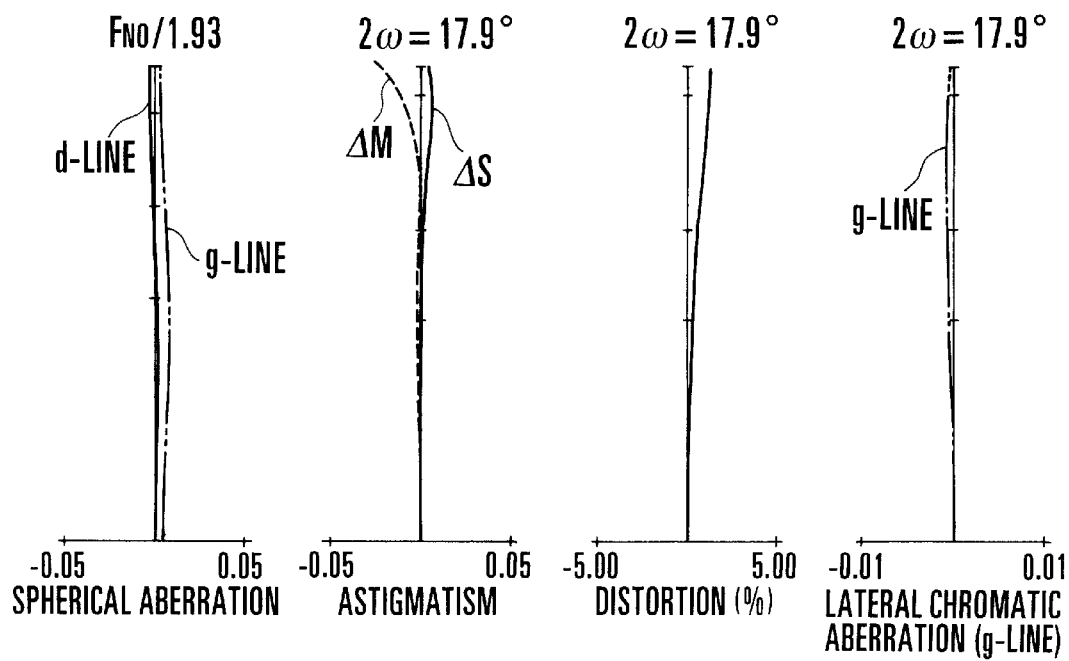
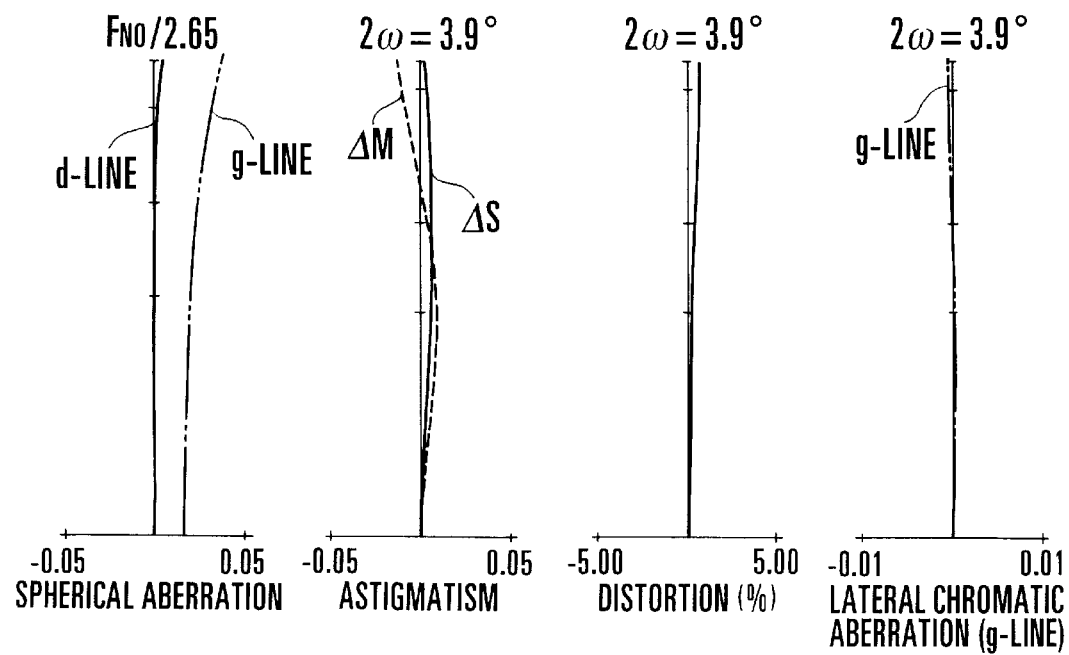

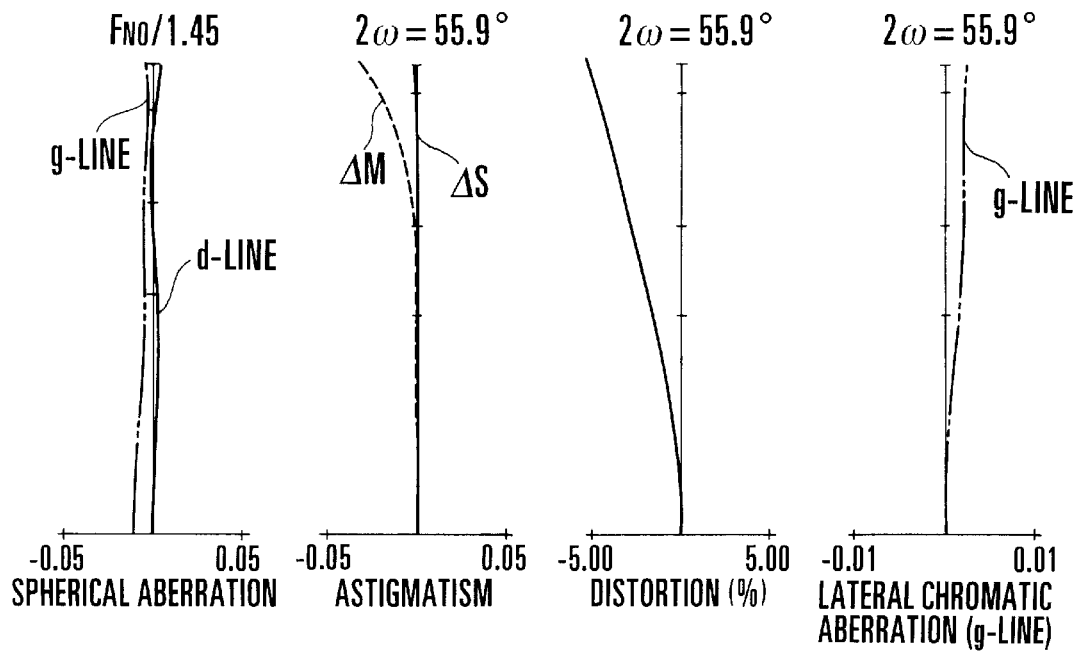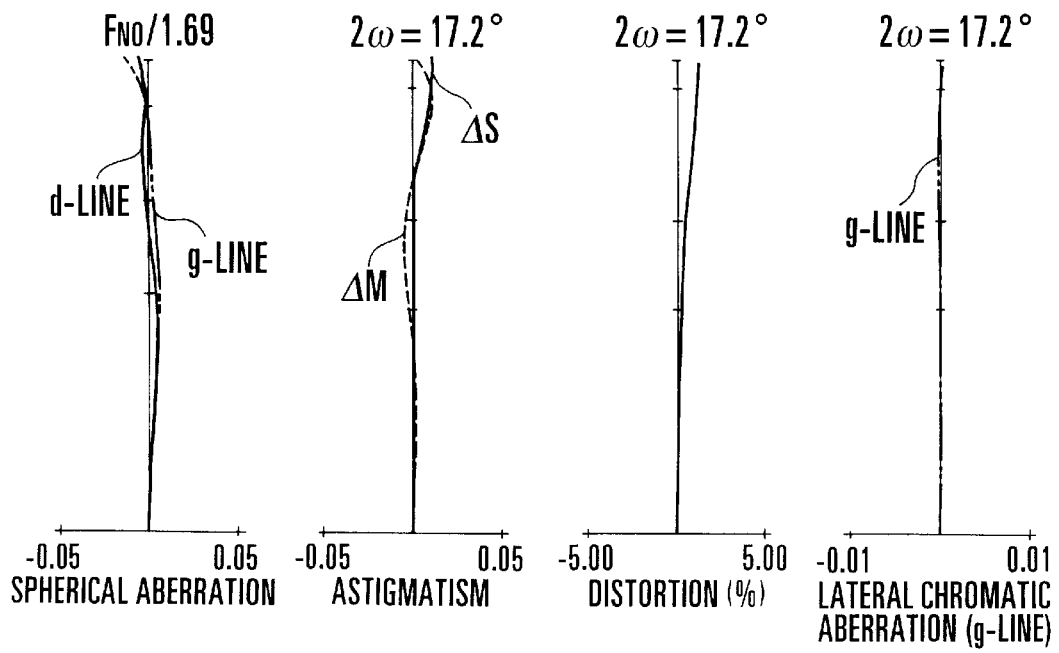

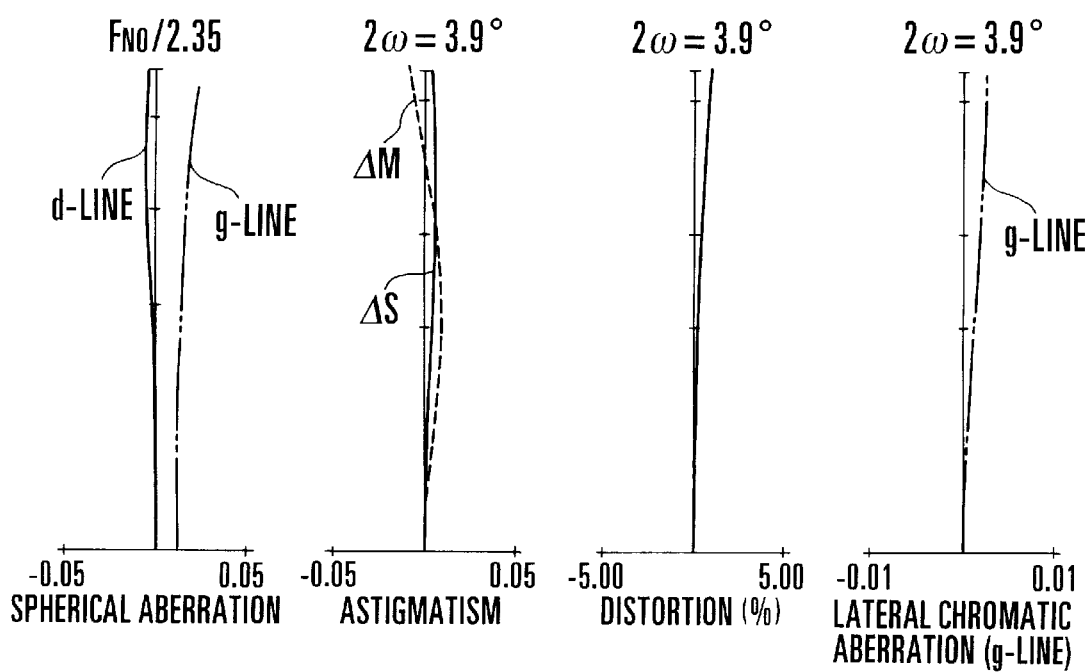

ZOOM LENS

BACKGROUND OF THE INVENTION

1. Field of the Invention

This invention relates to zoom lenses of the rear focus type and, more particularly, to zoom lenses of the rear focus type with a color separation prism in the space between the rear vertex and the CCD. Still more particularly, this invention relates to high range, large relative aperture zoom lenses of the rear focus type which provide, despite securing of such a long back focal distance, increase of the zoom ratio while still permitting the diameter of the front lens members to be minimized.

2. Description of Related Art

Recently, home video cameras of ever smaller size and lighter weight have been developed. Along with this development, a remarkable advance is seen even in decreasing the bulk and size of its taking zoom lens. In particular, efforts are being devoted to shortening of the total length of the entire lens system, reduction of the diameter of the front lens members and simplification of the form and the construction and arrangement of the constituent parts.

To attain these ends, one means is to move a lens unit other than the front or first lens unit to effect focusing. Such a zoom lens is known as the so-called "rear focus type".

In general, the rear focus type of zoom lens has many advantages over the type which performs focusing by moving the front lens unit. For example, it becomes easier to improve the compact form of the entire lens system. Close-up photography, particularly supershort focusing, becomes possible. Further, since the focusing lens unit is of small size and light weight, because the required driving torque for moving the focusing lens unit is reduced, rapid focus adjustment can be carried out.

Such a rear focus type of zoom lens is disclosed in, for example, Japanese Laid-Open Patent Applications Nos. Sho 62-206516, Sho 62-215225 and Sho 62-24213, in which the zoom lens comprises, in order from an object side, a positive first lens unit, a negative second lens unit, a positive third lens unit and a positive fourth lens unit, the second lens unit being axially moved to vary the focal length, and the fourth lens unit being axially moved to compensate for the image shift with zooming and also to effect focusing.

Also, in Japanese Laid-Open Patent Applications Nos. Hei 4-43311, Hei 4-153615, Hei 5-19165, Hei 5-27167 and Hei 5-60973, there are disclosed examples of the fourth lens unit consisting of one or two positive lenses. Also, in Japanese Laid-Open Patent Application No. Hei 5-60974, there is disclosed a zoom lens whose fourth lens unit is constructed with positive and negative lenses, totaling two lenses.

Further, in Japanese Laid-Open Patent Applications Nos. Sho 55-62419, Sho 62-24213, Sho 62-215225, Sho 56-114920, Hei 3-200113, Hei 4-242707, Hei 4-343313 and Hei 5-297275, there are disclosed, in their embodiments, zoom lenses in which the third and fourth lens units each are constructed with a positive lens and a negative lens, totaling two lenses.

Another recent trend in the art of video cameras has come along with enhancement (digitization) of the performance of video decks. To measure up to this, the image quality must ever more advance. One method of attaining the high image quality is to split the image by using a color separation optical system. Lenses that are suited to be used with this system have been proposed as disclosed in Japanese Laid-Open Patent Applications Nos. Hei 5-72474, Hei 6-51199, Hei 6-337353, Hei 6-347697, Hei 7-199069 and Hei 7-270684, etc.

As mentioned above, in general, for the zoom lenses, in view of achieving valuable reduction of the diameter of the front lens members with the size of the entire system at a minimum, the so-called "rear focus" configuration is more suitable than that of focusing by the first lens unit.

In the above-mentioned Japanese Laid-Open Patent Applications Nos. Hei 4-026811 and Hei 4-88309, however, their configurations are hardly amenable to dispose the color separation prism.

In the zoom lenses disclosed in the above-mentioned Japanese Laid-Open Patent Applications Nos. Hei 4-43311, Hei 4-153615, Hei 5-19165, Hei 5-27167 and Hei 5-60973, the zoom ratio is 6 to 8 or thereabout. For zoom lenses of higher ranges than this, the variation of chromatic aberrations with zooming would becomes too large to correct well. It is, therefore, difficult to assure maintenance of sufficient optical performance. Even the examples disclosed in the above-mentioned Japanese Laid-Open Patent Application No. Hei 5-60974, too, have a zoom ratio of 8, so that no sufficient increase of the range is achieved.

Further, in the examples disclosed in the above-mentioned Japanese Laid-Open Patent Applications Nos. Sho 55-62419, Sho 56-114920 and Hei 3-200113, either the first lens unit or the third lens unit, too, is made to move during zooming. This leads to increase the complexity of the operating mechanism. These zoom lenses are, therefore, not suited to achieve improvements of the compact form. In the examples disclosed in the above-mentioned Japanese Laid-Open Patent Applications Nos. Hei 4-242707, Hei 4-343313 and Hei 5-297275, construction and arrangement are made such that the third lens unit has a large air space. In addition, a negative lens included in the third lens unit is relatively weak in refractive power. In application to high range zoom lenses, therefore, this does not become a type that assures sufficient correction of the chromatic aberrations the third lens unit would produce. Furthermore, in the example disclosed in the above-mentioned Japanese Laid-Open Patent Application No. Hei 5-297275, a negative meniscus lens included in the third lens unit is made to have a strong concave curvature toward the image side. This is advantageous for obtaining the telephoto form, but does not favor the negative lens to treat the flare component of higher orders the positive lens produces. Such a type is, therefore, disadvantageous to be used in the large relative aperture, high range zoom lenses.

In the above-mentioned Japanese Laid-Open Patent Applications Nos. Hei 5-72474, Hei 6-51199, Hei 6-337353, Hei 6-347697, Hei 7-199069 and Hei 7-270684, any of their embodiments has as low a zoom ratio as 10 to 12. Thus, the sufficient increase of the range is also not achieved.

BRIEF SUMMARY OF THE INVENTION

An object of the invention is to overcome the above-described drawbacks of the conventional examples and to improve, in particular, the zoom lens disclosed in the above-mentioned Japanese Laid-Open Patent Application No. Hei 7-270684. The space an optical element such as color separation prism and another optical element which has an aim to protect the zoom lens are to occupy, is secured sufficiently at the back focal distance. Despite this, good optical performance is maintained throughout the entire zooming range and throughout the entire focusing range. Another object of the invention is to provide a zoom lens of the rear focus type which has a large relative aperture and whose range is increased to 16 or thereabout. A concomitant object of the invention is to provide a video camera to which such a zoom lens is releasably attached.

To attain the above objects, in accordance with one aspect of the invention, there is provided a zoom lens of the rear focus type, comprising, in order from an object side to an image side, a first lens unit of positive refractive power, a second lens unit of negative refractive power, a third lens unit of positive refractive power and a fourth lens unit of positive refractive power, the second and fourth lens units being moved to effect zooming, and the fourth lens unit being moved to effect focusing, wherein the third lens unit has a positive lens disposed closest to the image side, and a lens surface on the image side of the positive lens has a refractive power which is stronger than that of a lens surface on the object side of the positive lens. Further, the third lens unit has a negative lens disposed closest to the object side and having a concave surface facing the object side.

In more detail, to make approximately afocal a light beam which would be diverged by the third lens unit, the third lens unit is provided with the positive lens disposed closest to the image side. The form of the positive lens is then so specified that the configuration approaches the retro-focus type, thereby bringing the principal point of the third lens unit away from the second lens unit. As the principal points of the second and third lens units open wider, the height of incidence of the on-axial ray on the third lens unit becomes higher. This leads to a possibility of making longer the required focal length of the fourth lens unit for the predetermined values of the focal length of the entire system. In such a manner, the working distance or the back focal distance is much increased. That is, because the light beam exiting from the third lens unit is almost afocal, the back focal distance as calculated in the principal point system becomes almost the same as the focal length of the fourth lens unit. Under the condition that the focal length of the entire system is fixed, the focal length of the fourth lens unit is made longer. To this purpose, therefore, it is understandable from FIG. 19 that all what is need to do is only to increase the height of incidence "h" of the on-axial light ray on the third lens unit.

Further, according to the invention, the following conditions are satisfied:

$$1.0 < |R_{31r}/R_{32r}| < 5.0$$

$$1.5 < f_3/f_{32} < 5.0$$

where $R_{31r}$ and $R_{32r}$ are radii of curvature of the lens surfaces on the object side and on the image side of the positive lens, respectively, and $f_{32}$ and $f_3$ are focal lengths of the positive lens and the third lens unit, respectively.

When these conditions are satisfied, the requirements of securing the back focal distance and of correcting aberrations are fulfilled at once.

In particular, it is preferable that the positive lens of the third lens unit is a cemented lens composed of a positive lens and a negative lens.

These and other objects and features of the invention will become apparent from the following detailed description of the preferred embodiments thereof taken in conjunction with the accompanying drawings.

BRIEF DESCRIPTION OF THE SEVERAL VIEWS OF THE DRAWING

FIGS. 10A-1 to 10A-4, 10B-1 to 10B-4 and 10C-1 to 10C-4 are graphic representations of the aberrations of the numerical example 1 of the invention.

FIGS. 11A-1 to 11A-4, 11B-1 to 11B-4 and 11C-1 to 11C-4 are graphic representations of the aberrations of the numerical example 2 of the invention.

FIGS. 12A-1 to 12A-4, 12B-1 to 12B-4 and 12C-1 to 12C-4 are graphic representations of the aberrations of the numerical example 3 of the invention.

FIGS. 13A-1 to 13A-4, 13B-1 to 13B-4 and 13C-1 to 13C-4 are graphic representations of the aberrations of the numerical example 4 of the invention.

FIGS. 14A-1 to 14A-4, 14B-1 to 14B-4 and 14C-1 to 14C-4 are graphic representations of the aberrations of the numerical example 5 of the invention.

FIGS. 15A-1 to 15A-4, 15B-1 to 15B-4 and 15C-1 to 15C-4 are graphic representations of the aberrations of the numerical example 6 of the invention.

FIGS. 16A-1 to 16A-4, 16B-1 to 16B-4 and 16C-1 to 16C-4 are graphic representations of the aberrations of the numerical example 7 of the invention.

FIGS. 17A-1 to 17A-4, 17B-1 to 17B-4 and 17C-1 to 17C-4 are graphic representations of the aberrations of the numerical example 8 of the invention.

FIGS. 18A-1 to 18A-4, 18B-1 to 18B-4 and 18C-1 to 18C-4 are graphic representations of the aberrations of the numerical example 9 of the invention.

FIGS. 23-1 to 23-4 are graphic representations of the aberrations of the numerical example 10 of the invention in the wide-angle end.

FIGS. 24-1 to 24-4 are graphic representations of the aberrations of the numerical example 10 of the invention in a middle focal length position.

FIGS. 25-1 to 25-4 are graphic representations of the aberrations of the numerical example 10 of the invention in the telephoto end.

FIGS. 26-1 to 26-4 are graphic representations of the aberrations of the numerical example 11 of the invention in the wide-angle end.

FIGS. 27-1 to 27-4 are graphic representations of the aberrations of the numerical example 11 of the invention in a middle focal length position.

FIGS. 28-1 to 28-4 are graphic representations of the aberrations of the numerical example 11 of the invention in the telephoto end.

FIGS. 29-1 to 29-4 are graphic representations of the aberrations of the numerical example 12 of the invention in the wide-angle end.

FIGS. 30-1 to 30-4 are graphic representations of the aberrations of the numerical example 12 of the invention in a middle focal length position.

FIGS. 31-1 to 31-4 are graphic representations of the aberrations of the numerical example 12 of the invention in the telephoto end.

Figure 1:
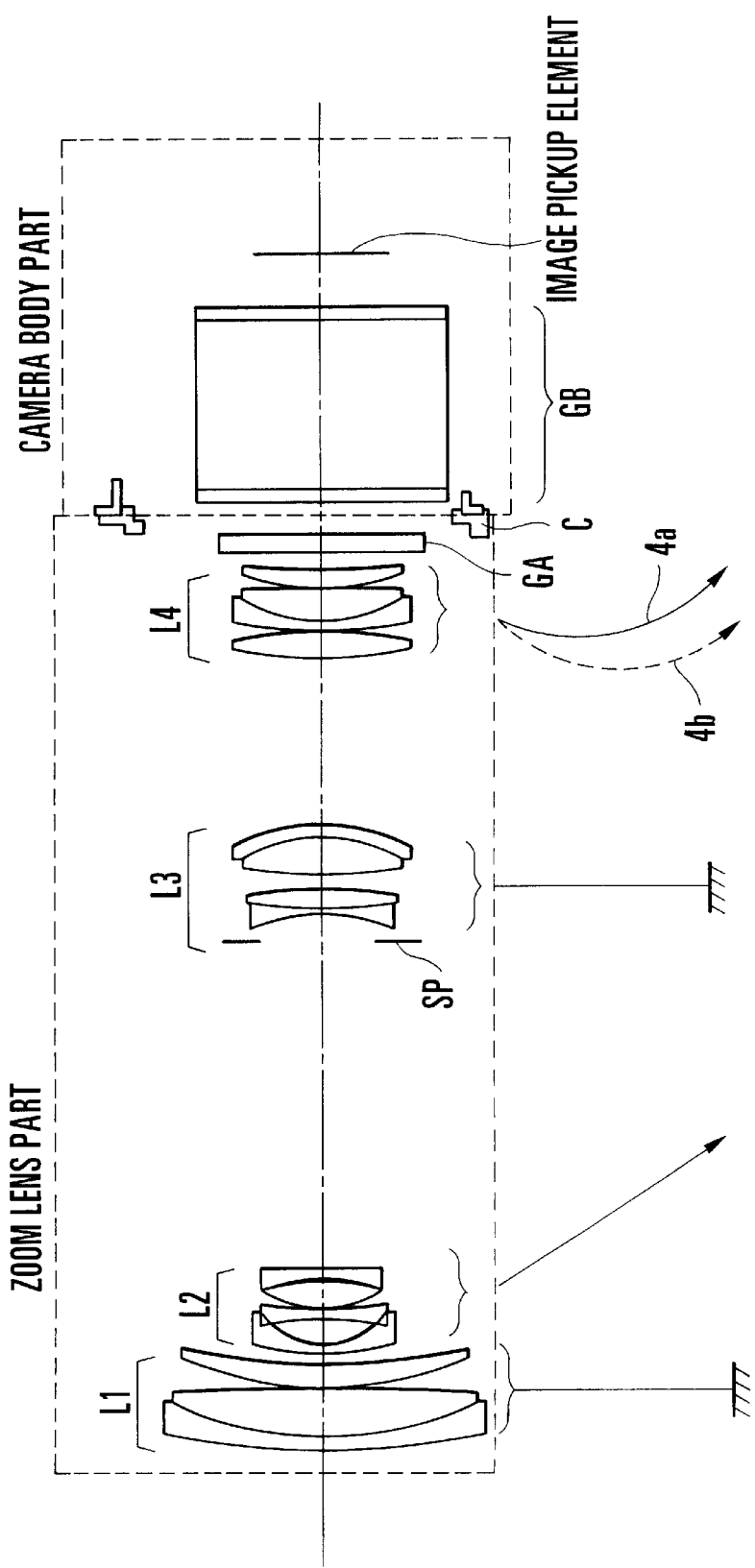
FIG. 1 is a lens block diagram of a numerical example 1 of the invention.
Figure 2:
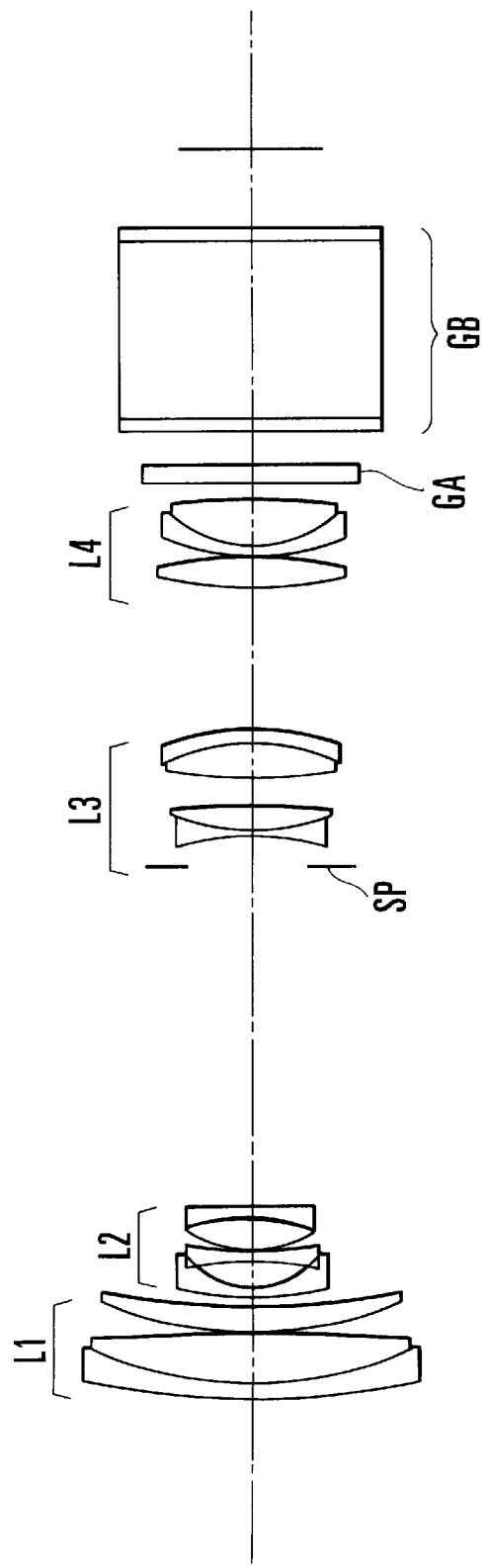
FIG. 2 is a lens block diagram of a numerical example 2 of the invention.
Figure 3:
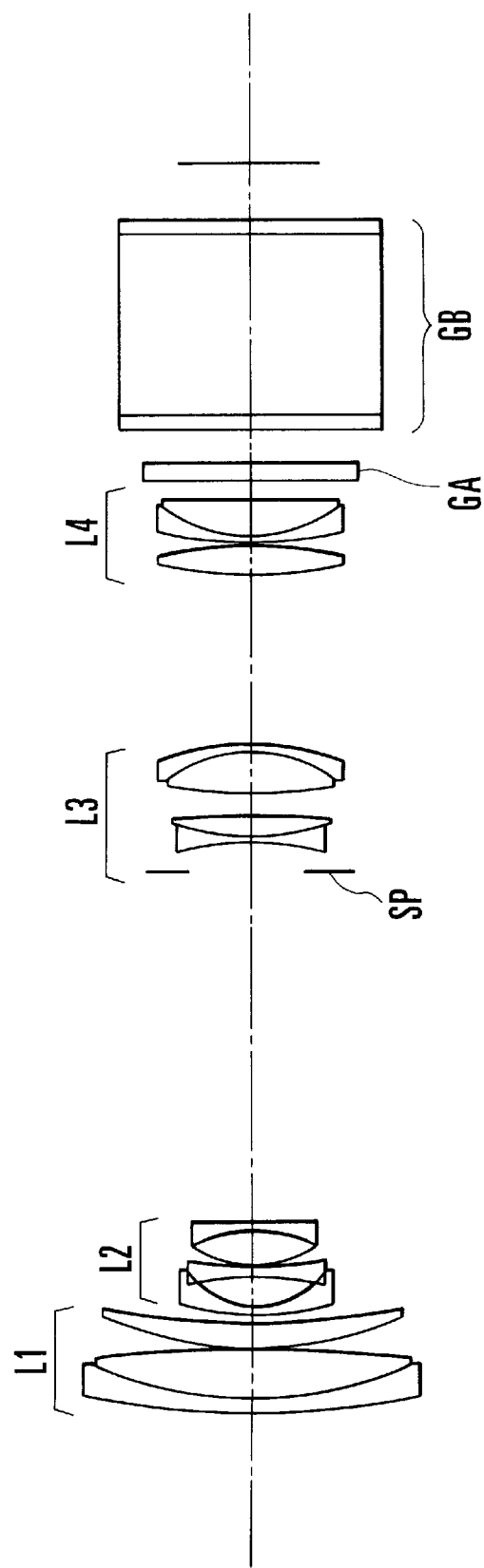
FIG. 3 is a lens block diagram of a numerical example 3 of the invention.
Figure 4:
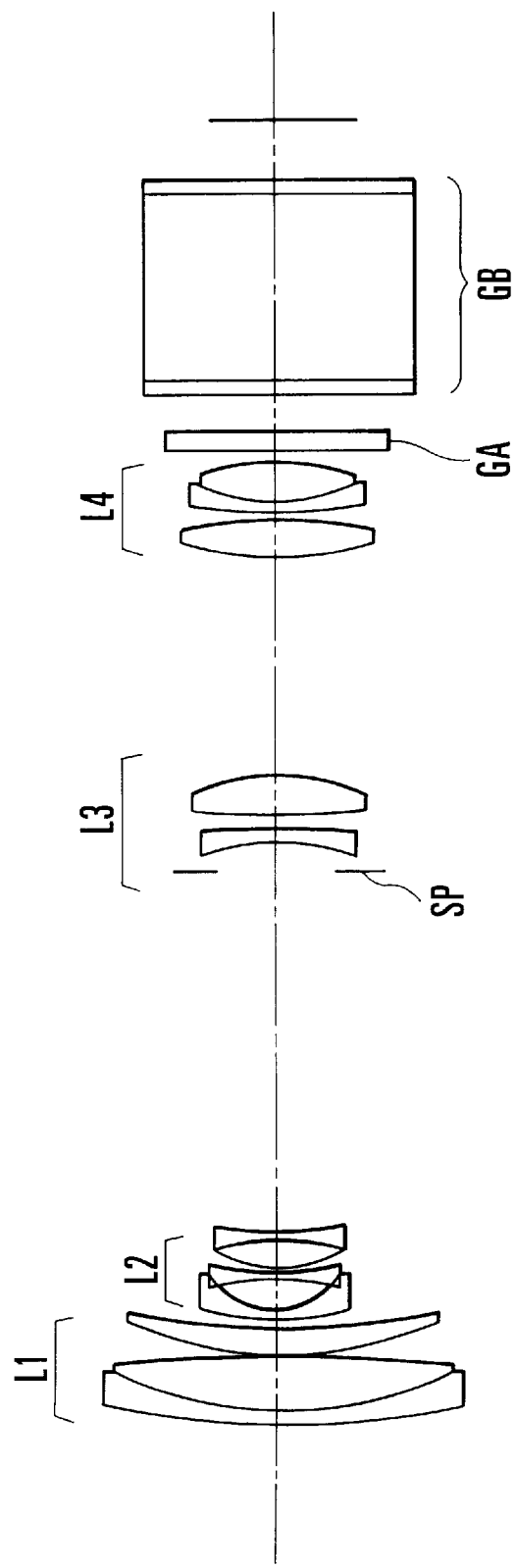
FIG. 4 is a lens block diagram of a numerical example 4 of the invention.
Figure 5:
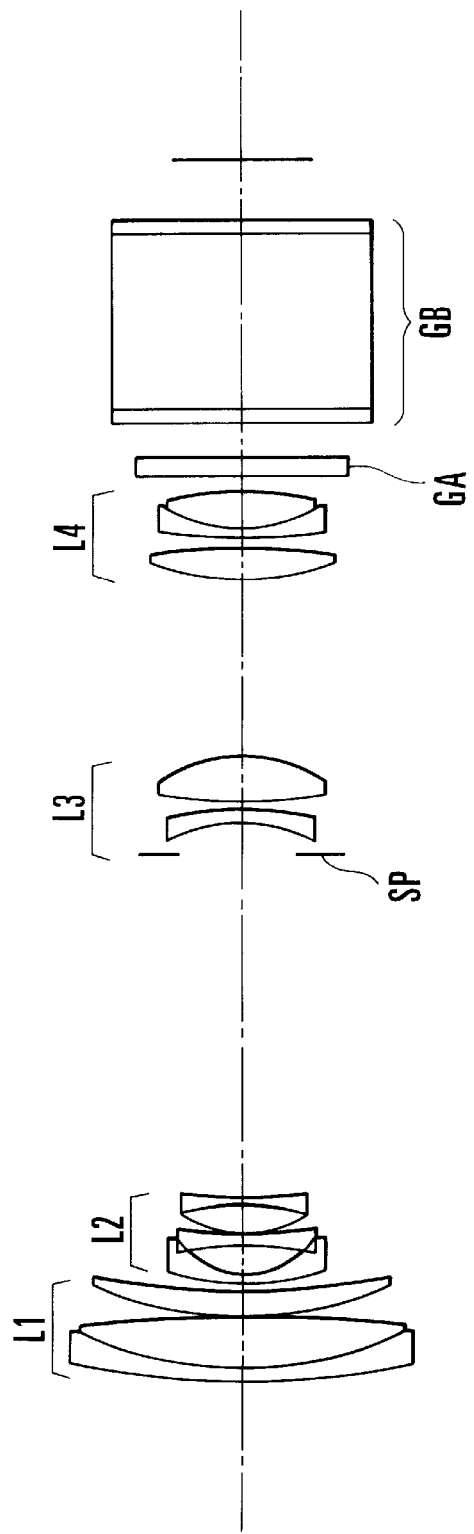
FIG. 5 is a lens block diagram of a numerical example 5 of the invention.
Figure 6:
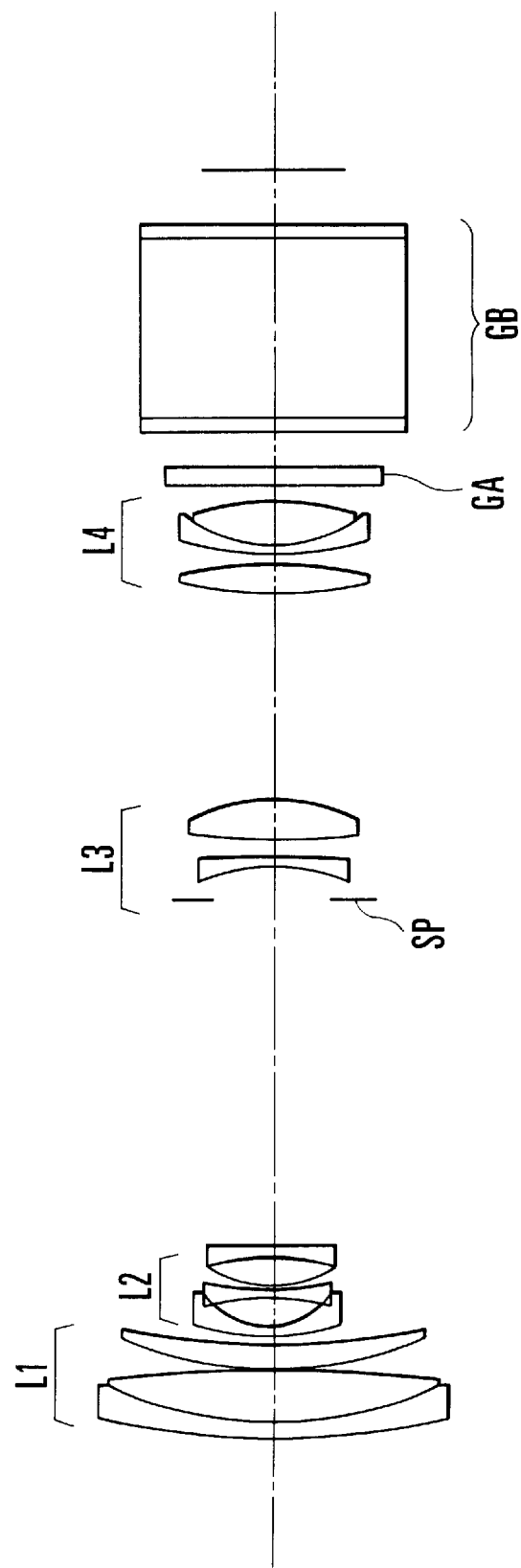
FIG. 6 is a lens block diagram of a numerical example 6 of the invention.
Figure 7:
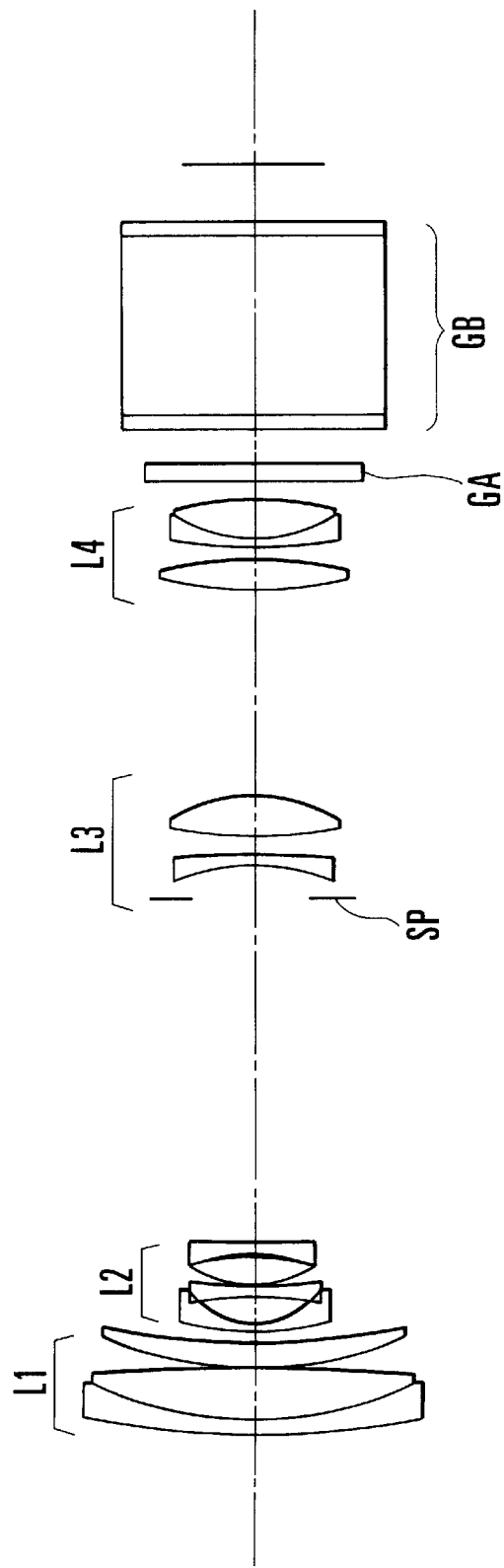
FIG. 7 is a lens block diagram of a numerical example 7 of the invention.
Figure 8:
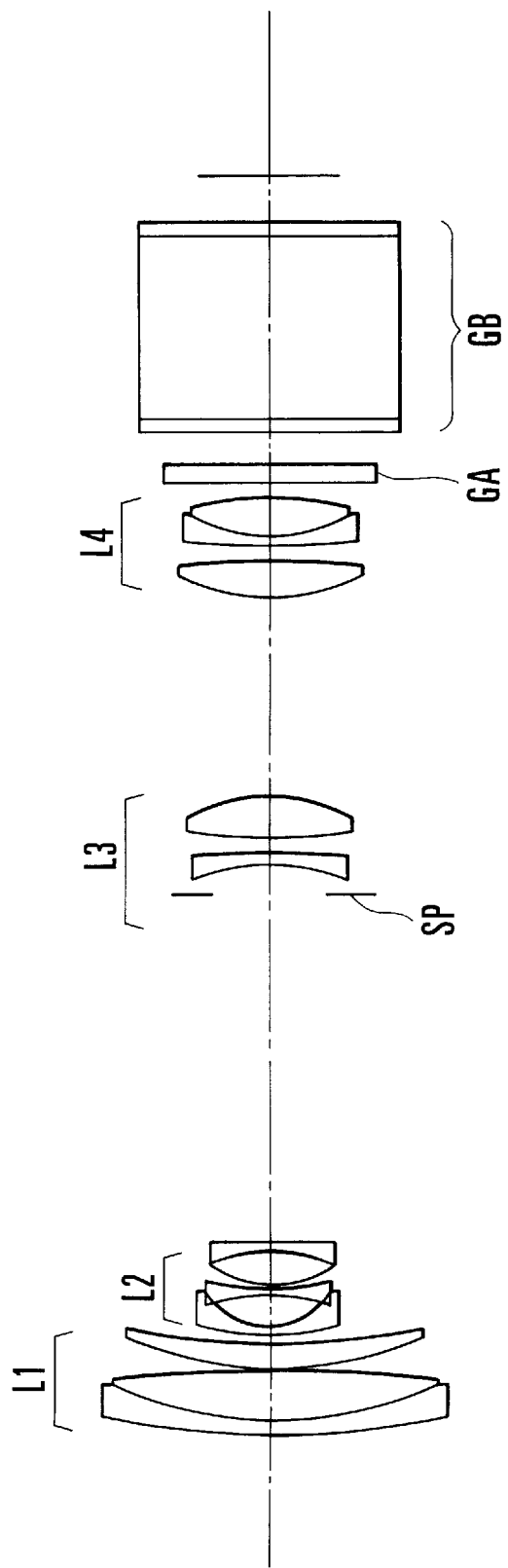
FIG. 8 is a lens block diagram of a numerical example 8 of the invention.
Figure 9:
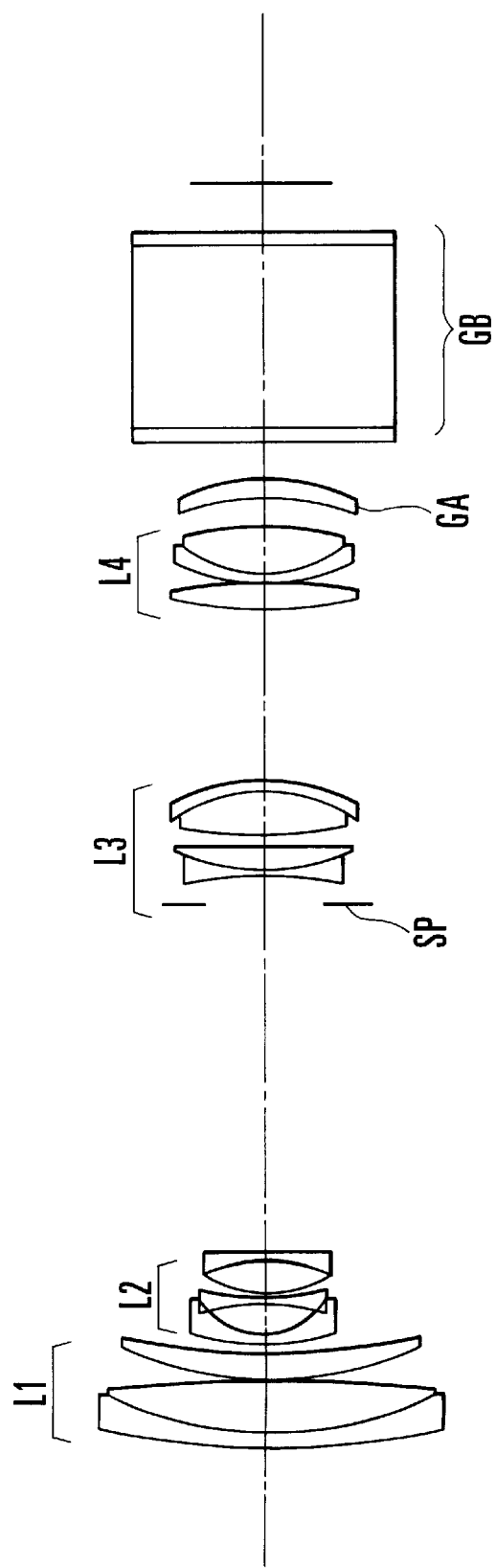
FIG. 9 is a lens block diagram of a numerical example 9 of the invention.
Figure 19:
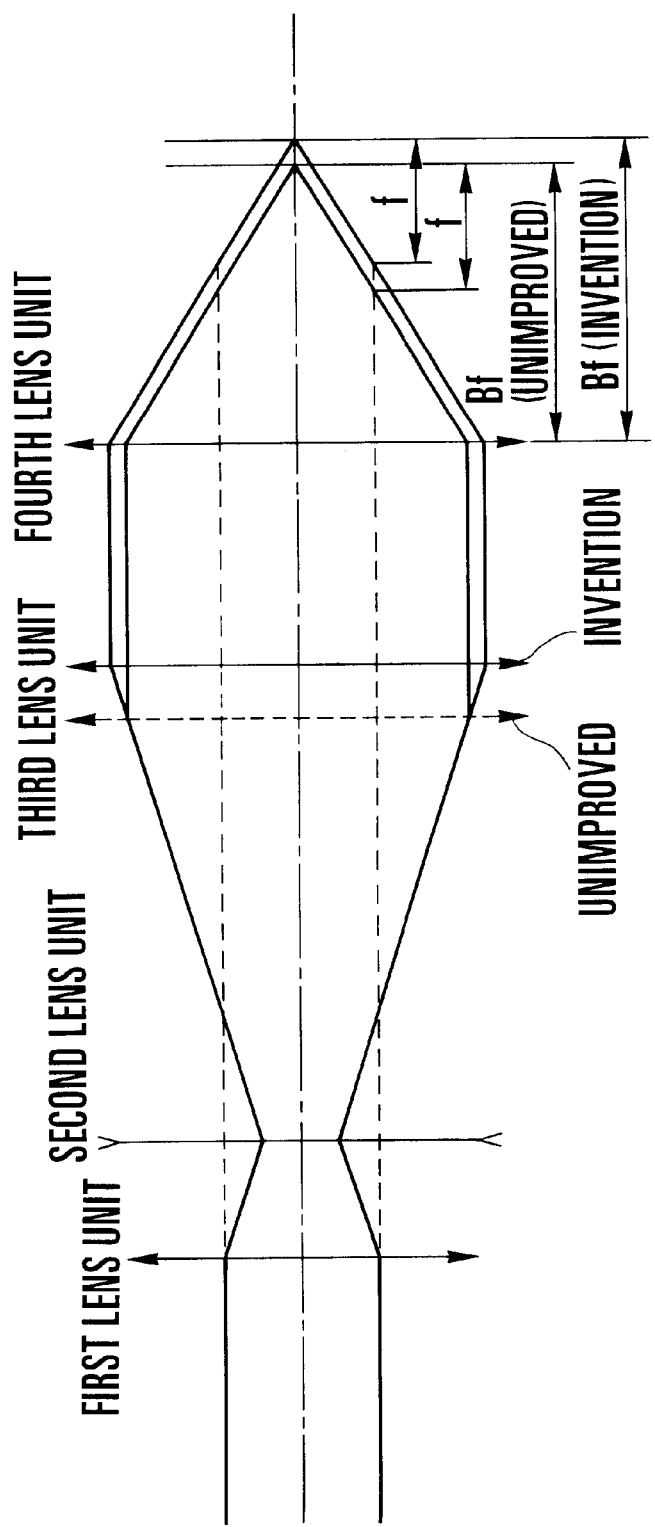
FIG. 19 is a diagram of geometry for explaining the principle of the zoom lens of the invention.

In the aberration curves, IP stands for the image plane, AM for the meridional image focus, AS for the sagittal image focus, d for the spectral d-line, and g for the spectral g-line.

DETAILED DESCRIPTION OF THE INVENTION

Hereinafter, preferred embodiments of the invention will be described in detail with reference to the drawings.

FIG. 1 through FIG. 9 are longitudinal section views of numerical examples 1 to 9 of zoom lenses of the rear focus type of the invention, respectively. The aberrations of the numerical examples 1 to 9 are shown in FIGS. 10A-1 to 10A-4, 10B-1 to 10B-4 and 10C-1 to 10C-4 through FIGS. 18A-1 to 18A-4, 18B-1 to 18B-4 and 18C-1 to 18C-4, respectively. Of the aberration curves, the ones whose figure numbers are suffixed A are in the wide-angle end, the ones whose figure numbers are suffixed B are in the middle position and the ones whose figure numbers are suffixed C are in the telephoto end.

In the block diagrams, reference character L1 denotes the first lens unit of positive refractive power, reference character L2 denotes the second lens unit of negative refractive power, reference character L3 denotes the third lens unit of positive refractive power and reference character L4 denotes the fourth lens unit of positive refractive power. An aperture stop SP is disposed just in front of the third lens unit L3. Reference character GA denotes a glass plate for protecting the zoom lens. Reference character GB is a glass block such as a color separation prism, a face plate for the CCD or a low-pass filter. Parts from the first lens unit L1 to the protection glass plate GA constitute a zoom lens part, which is releasably attached to a camera body part through a mount member C. Therefore, the glass block GB and the subsequent parts are included in the camera body part.

In the present embodiment, during zooming from the wide-angle end to the telephoto end, the second lens unit moves axially toward the image side as shown by the arrow and the fourth lens unit axially moves to compensate for the shift of an image plane. For focusing purposes, the fourth lens unit is also made axially movable. That is, the rear focusing method is employed. In particular, as shown by the curved lines 4a and 4b in FIG. 1, the fourth lens unit is made to move, while depicting a locus convex toward the object side, as zooming from the wide-angle end to the telephoto end, thereby assuring efficient utilization of the space between the third and fourth lens units. A shortening of the total length of the entire lens system is thus achieved advantageously. The solid line curve 4a and the dashed line curve 4b represent the required loci of motion for compensating for the image shift over the entire zooming range with an object at infinity and at a minimum distance, respectively. It is to be noted that the first and third lens units remain stationary during zooming and during focusing.

In the numerical examples 1 to 3 and 9, the third lens unit is constructed with a cemented lens composed of negative and positive lenses and having a negative refractive power and a cemented lens composed of positive and negative lenses and having a positive refractive power. As a whole, these cemented lenses constitute a positive lens unit of the retro-focus type. Moreover, the cemented lens of negative refractive power has a concave surface facing the object side, thus giving the role of bringing the principal point of the third lens unit away from the second lens unit. So, this contributes to an increase of the back focal distance. In particular, the lens surface on the object side of the cemented lens of negative refractive power is given a stronger negative refractive power (shorter radius of curvature) than that of the lens surface on the image side, so that the principal point takes its place closer to the image plane than was heretofore possible.

Meanwhile, a lens surface on the image side of the cemented lens of positive refractive power has a refractive power which is stronger (shorter in the radius of curvature) than that of a lens surface on the object side of the cemented lens of positive refractive power. This cemented lens, too, bears a similar role in bringing the principal point of the third lens unit away from the second lens unit. So, it assists in increasing the focal length of the fourth lens unit, contributing to an increase of the back focal distance.

Similarly, in the numerical examples 4 to 8, the third lens unit is constructed with a negative single lens and a positive single lens. As a whole, they constitute a positive lens unit of the retro-focus type. Further, a lens surface on the object side of the negative single lens is strong in concave curvature toward the object side as it bears the role of bringing the principal point of the third lens unit away from the second lens unit. So, it assists in increasing the focal length of the fourth lens unit, contributing to an increase of the back focal distance.

Meanwhile, a lens surface on the image side of the positive single lens has a stronger refractive power (shorter in the radius of curvature) than that of a lens surface on the object side of the positive single lens. This lens bears a role of bringing the principal point of the third lens unit away from the second lens unit. So, it assists in increasing the focal length of the fourth lens unit, contributing to an increase of the back focal distance.

It will be appreciated that in the embodiment of the invention, the third lens unit is provided with a positive lens disposed closest to the image side, wherein a lens surface on the image side of the positive lens is made convex toward the image side, thereby bringing the principal point to a more rear position. Thus, to allow the color separation prism to be disposed behind the zoom lens, the increase of the back focal distance is thus secured.

Although the foregoing features suffice for providing the zoom lens that sufficiently secures the long back focal distance and has a high range, in order to achieve further improvements, it is preferable to satisfy one of the following conditions:

(i) Letting a distance, when reduced to air, from the last lens surface of the zoom lens to an image plane in the wide-angle end with an object at infinity be denoted by BF, and a focal length, a full aperture F-number and a semiangle of field in the wide-angle end of the entire zoom lens be denoted by $f_W$, $F_{NW}$, and $\omega$, respectively, the following condition is satisfied:

$$8.1 < BF \times \sqrt{F_{NW}}/(f_W \times \tan \omega) < 13.3 \quad (1).$$

When the lower limit is exceeded, as this means that the zoom lens is too faster, spherical aberrations and come of higher orders are produced, which are difficult to correct.

When the F-number is darker than the upper limit, the axial light beam becomes smaller in diameter.

By this, it becomes possible to reduce the size of the color separation prism in the space between the last lens surface of the zoom lens and the image plane. In other words, despite the fact that there is no need to elongate the back focal distance, the back focal length must be made longer. Thus, the total length of the zoom lens is caused to increase greatly.

(ii) Letting radii of curvature of lens surfaces on the object side and on the image side of the positive lens disposed closest to the image side included in the third lens unit be denoted by $R_{31r}$ and $R_{32r}$, respectively, and focal lengths of the positive lens and the third lens unit be denoted by $f_{32}$ and $f_3$, respectively, the following conditions are satisfied:

$$1.0 < |R_{31r}/R_{32r}| < 5.0 \quad (2)$$

$$1.5 < f_3/f_{32} < 5.0 \quad (3).$$

The inequalities of conditions (2) and (3) both have an aim to regulate the curvature of the lens surface closest to the image side in the third lens unit. When the lower limits are exceeded, as this means that the curvature of the rear surface and the focal length of the positive lens are too loose, it becomes difficult to keep the back focal distance long enough or accomplish the object of the invention. When the upper limits are exceeded, it becomes difficult to correct the spherical aberrations of higher orders which are produced when the light beam emerging from the third lens unit enters the fourth lens unit having the focusing function. So, the improvement of the performance cannot be achieved.

(iii) Letting the sum of air separations between the first and second lens units and between the second and third lens units be denoted by L, a semiangle of field in the wide-angle end be denoted by $\omega$, focal lengths in the wide-angle end and in the telephoto end of the zoom lens be denoted by $f_W$ and $f_T$, respectively, a focal length of the fourth lens unit be denoted by $f_4$, and an air separation between the third and fourth lens units for an infinitely distant object in the telephoto end be denoted by D, the following conditions are satisfied:

$$0.66 < L/(f_T \cdot \tan \omega) < 1.17 \quad (4)$$

$$4.00 < f_4/f_W < 7.00 \quad (5)$$

$$0.10 < D/f_T < 0.30 \quad (6).$$

The inequalities of condition (4) are to optimize the relationship between the space for zooming movement of the second lens unit and the zoom ratio. When the upper limit is exceeded, as this means that the space for zooming movement is too wide, the total length of the entire system is caused to increase greatly. When the lower limit is exceeded, the negative refractive power of the second lens unit has to be strengthened. Otherwise, the share of varying the focal length could not be earned. So, the negative Petzval sum that represents the curvature of field is increased objectionably.

The inequalities of condition (5) are to optimize the back focal distance. When the upper limit is exceeded, the back focal distance becomes longer than necessary, causing the total length of the entire system to increase greatly. When the lower limit is exceeded, it becomes difficult to secure the back focal distance long enough.

The inequalities of condition (6) are to optimize the relationship between the space for focusing movement of the fourth lens unit and the focal length in the telephoto end of the entire system. When the air separation D is taken at a larger value than the upper limit, the total length of the entire system is caused to increase objectionably. When the lower limit is exceeded, it becomes impossible to secure a sufficient space for the focusing purpose. So, a problem arises in the manageability of the zoom lens.

Also, letting a radius of curvature of a lens surface closest to the object side in the third lens unit be denoted by $R_{31f}$, a focal length of a lens disposed closest to the object side in the third lens unit be denoted by $f_{31}$, and a focal length of the third lens unit be denoted by $f_3$, the following conditions are satisfied:

$$-0.60 < R_{31f}/f_3 < -0.10 \quad (7)$$

$$0.30 < R_{31f}/f_{31} < 0.90 \quad (8).$$

The inequalities of conditions (7) and (8) both have an aim to regulate the curvature of the lens surface closest to the object side in the third lens unit. When the upper limits are exceeded, as this means that the curvature and the focal length of the positive lens are too loose, it becomes difficult to keep the back focal distance long enough or accomplish the object of the invention. When the lower limits are exceeded, it becomes difficult to correct the spherical aberrations of higher orders which are produced when the light beam emerging from the second lens unit enters the third lens unit in the wide-angle end. So, the improvement of the performance cannot be achieved.

In the meantime, the chromatic aberrations for the telephoto end must be corrected sufficiently. For this purpose, all that are necessary to form the second lens unit are at least two negative lenses and at least one positive lens. In the present embodiment, as described above, an additional negative lens is used as disposed closest to the image side in the second lens unit to thereby widen the interval between the principal points of the second and third lens units. This negative lens contributes to even more increase of the back focal distance.

To achieve further improvements of the correction of aberrations, particularly chromatic aberrations, it is preferable to use at least one cemented lens in the third lens unit as shown in the numerical examples 1 to 3 and 9. As mentioned above, the image quality of the video camera is ever increasing. Therefore, the chromatic aberrations, particularly the lateral chromatic aberration, which little mattered in the past, come to be a problem. So, this is corrected well.

Also, in the present embodiment, in order that the image of the first lens unit be made small, the aperture stop is disposed just in front of the third lens unit. However, the location of the aperture stop is not confined to this position. It is to be understood that the aperture stop may otherwise put to either the space between the third and fourth lens units or the space between the negative and positive lenses in the third lens unit.

Incidentally, in the present embodiment, the third lens unit is made of minus-plus refractive power arrangement in this order from the object side to lengthen the exit pupil, so that the light rays emerging from the zoom lens become almost telecentric. As the color separation prism is positioned behind the zoom lens, the angle at which the light rays enter the color separation prism is made gentler to thereby eliminate the change of the reflection characteristic of the color separating system by the wavelengths. This permits the color separation to be carried out with high fidelity. Hence, the color reproduction of the image is greatly improved.

Also, in the high range zoom lens such as that of the invention, the focal length becomes very long in the telephoto end. Therefore, the performance at or near the telephoto end is greatly influenced by the second lens unit. With this in mind, an aspheric surface may be introduced into this second lens unit. If so, it is possible to increase the optical performance.

Incidentally, the aspheric surface is fundamentally aimed at correcting spherical aberrations. So, it is desirable to adopt a shape in which the positive refractive power becomes progressively weaker toward the margin of the lens.

Further, in order to correct aberrations, particularly chromatic aberrations, even better, at least one positive lens in the fourth lens unit is made up from a glass whose Abbe number vd falls within the following range:

$$vd > 64.0$$

This inequality of condition is for correcting the lateral chromatic aberration well. When the lower limit is exceeded, as this means that the Abbe number is too small, under-correction of the lateral chromatic aberration results. So, it should be avoided.

Next, the numerical data for the numerical examples 1 to 9 of the invention are shown in the tables below, where Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side.

It is to be noted that R28 and R29 in the numerical example 1, R26 to R27 in the numerical examples 2, 3 and 9 and R24 and R25 in the numerical examples 4 to 8, each define a protection glass plate. R30 to R33 in the numerical example 1, R28 to R31 in the numerical examples 2, 3 and 9 and R26 to R29 in the numerical examples 4 to 8, each define a glass block such as a color separation prism, an optical filter or a face plate.

The values of the factors in the above-described conditions (1) to (8) for the numerical examples 1 to 9 are listed in Table-1.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

In the values of the aspheric coefficients, the notation "e-0X" means $10^{-x}$.

TABLE 1

| Condition No. | Numerical Example | | | | | | | | |
|---|---|---|---|---|---|---|---|---|---|
| | 1 | 2 | 3 | 4 | 5 | 6 | 7 | 8 | 9 |
| (1) | 10.59 | 10.90 | 11.09 | 9.96 | 9.59 | 10.03 | 10.03 | 10.04 | 9.08 |
| (2) | 2.428 | 1.313 | 1.338 | 3.360 | 3.191 | 3.296 | 3.299 | 3.353 | 1.373 |
| (3) | 2.304 | 2.483 | 2.608 | 2.824 | 2.648 | 2.750 | 2.771 | 2.893 | 2.880 |
| (4) | 0.935 | 0.932 | 0.908 | 0.917 | 0.925 | 0.921 | 0.921 | 0.918 | 0.998 |
| (5) | 5.159 | 5.178 | 5.265 | 5.281 | 5.220 | 5.294 | 5.288 | 5.278 | 5.266 |
| (6) | 0.225 | 0.192 | 0.208 | 0.260 | 0.228 | 0.253 | 0.255 | 0.258 | 0.20 |
| (7) | −0.255 | −0.328 | −0.386 | −0.269 | −0.276 | −0.268 | −0.275 | −0.257 | −0.269 |
| (8) | 0.412 | 0.597 | 0.758 | 0.598 | 0.548 | 0.575 | 0.594 | 0.593 | 0.750 |

Numerical Example 1:

f = 1~15.42  Fno = 1.65~2.61  2ω = 59.0°~4.2°

| | | | |
|---|---|---|---|
| R1 = 14.996 | D1 = 0.30 | N1 = 1.846660 | v1 = 23.8 |
| R2 = 7.420 | D2 = 1.01 | N2 = 1.603112 | v2 = 60.7 |
| R3 = −55.755 | D3 = 0.04 | | |
| R4 = 6.528 | D4 = 0.58 | N3 = 1.696797 | v3 = 55.5 |
| R5 = 16.528 | D5 = Variable | | |
| R6 = 6.618 | D6 = 0.16 | N4 = 1.882997 | v4 = 40.8 |
| R7 = 1.639 | D7 = 0.67 | | |
| R8 = −5.612 | D8 = 0.14 | N5 = 1.882997 | v5 = 40.8 |
| R9 = 6.435 | D9 = 0.11 | | |
| R10 = 3.282 | D10 = 0.55 | N6 = 1.846660 | v6 = 23.8 |
| R11 = −4.917 | D11 = 0.09 | | |
| R12 = −3.110 | D12 = 0.14 | N7 = 1.772499 | v7 = 49.6 |
| R13 = 52.786 | D13 = Variable | | |
| R14 = Stop | D14 = 0.60 | | |
| R15 = −4.354 | D15 = 0.14 | N8 = 1.772499 | v8 = 49.6 |
| R16 = 7.442 | D16 = 0.44 | N9 = 1.846660 | v9 = 23.8 |
| R17 = −12.275 | D17 = 0.39 | | |
| R18* = 12.057 | D18 = 0.81 | N10 = 1.583126 | v10 = 59.4 |
| R19 = −3.212 | D19 = 0.17 | N11 = 1.846660 | v11 = 23.8 |
| R20 = −4.966 | D20 = Variable | | |

TABLE 1-continued

| | | | |
|---|---|---|---|
| R21 = 7.169 | D21 = 0.60 | N12 = 1.583126 | ν12 = 59.4 |
| R22 = −10.614 | D22 = 0.03 | | |
| R23 = 10.386 | D23 = 0.18 | N13 = 1.805181 | ν13 = 25.4 |
| R24 = 3.038 | D24 = 0.74 | N14 = 1.487490 | ν14 = 70.2 |
| R25 = −68.690 | D25 = 0.03 | | |
| R26 = 5.180 | D26 = 0.42 | N15 = 1.603420 | ν15 = 38.0 |
| R27 = 18.977 | D27 = 0.35 | | |
| R28 = ∞ | D28 = 0.35 | N16 = 1.516330 | ν16 = 64.2 |
| R29 = ∞ | D29 = 0.71 | | |
| R30 = ∞ | D30 = 0.24 | N17 = 1.550000 | ν17 = 60.0 |
| R31 = ∞ | D31 = 3.54 | N18 = 1.589130 | ν18 = 61.2 |
| R32 = ∞ | D32 = 0.42 | N19 = 1.520000 | ν19 = 64.0 |
| R33 = ∞ | | | |

| Variable | Focal Length | | |
|---|---|---|---|
| Separation | 1.00 | 6.04 | 15.42 |
| D5 | 0.16 | 5.31 | 6.76 |
| D13 | 6.89 | 1.75 | 0.30 |
| D20 | 3.50 | 2.49 | 3.47 |

Aspheric Coefficients:

R18: K = −1.59540e + 00   B = −2.75872e − 03   C = 2.79593e − 04
     D = −1.02196e − 04   E = 1.51980e − 05

Numerical Example 2:

$f = 1\sim15.43$   $Fno = 1.65\sim2.65$   $2\omega = 59.0°\sim4.2°$

| | | | |
|---|---|---|---|
| R1 = 14.448 | D1 = 0.30 | N1 = 1.846660 | ν1 = 23.8 |
| R2 = 7.307 | D2 = 0.99 | N2 = 1.603112 | ν2 = 60.7 |
| R3 = −68.744 | D3 = 0.04 | | |
| R4 = 6.579 | D4 = 0.57 | N3 = 1.696797 | ν3 = 55.5 |
| R5 = 17.338 | D5 = Variable | | |
| R6 = 7.309 | D6 = 0.16 | N4 = 1.882997 | ν4 = 40.8 |
| R7 = 1.622 | D7 = 0.65 | | |
| R8 = −5.306 | D8 = 0.14 | N5 = 1.882997 | ν5 = 40.8 |
| R9 = 8.431 | D9 = 0.11 | | |
| R10 = 3.341 | D10 = 0.58 | N6 = 1.846660 | ν6 = 23.8 |
| R11 = −5.076 | D11 = 0.06 | | |
| R12 = −3.356 | D12 = 0.14 | N7 = 1.772499 | ν7 = 49.6 |
| R13 = 25.317 | D13 = Variable | | |
| R14 = Stop | D14 = 0.57 | | |
| R15 = −5.556 | D15 = 0.14 | N8 = 1.772499 | ν8 = 49.6 |
| R16 = 4.910 | D16 = 0.42 | N9 = 1.846660 | ν9 = 23.8 |
| R17 = −54.213 | D17 = 0.55 | | |
| R18* = 7.365 | D18 = 0.85 | N10 = 1.583126 | ν10 = 59.4 |
| R19 = −3.269 | D19 = 0.17 | N11 = 1.846660 | ν11 = 23.8 |
| R20 = −5.610 | D20 = Variable | | |
| R21* = 10.245 | D21 = 0.53 | N12 = 1.583126 | ν12 = 59.4 |
| R22 = −11.430 | D22 = 0.03 | | |
| R23 = 4.850 | D23 = 0.18 | N13 = 1.846660 | ν13 = 23.8 |
| R24 = 2.832 | D24 = 0.92 | N14 = 1.487490 | ν14 = 70.2 |
| R25 = −11.531 | D25 = 0.35 | | |
| R26 = ∞ | D26 = 0.35 | N15 = 1.516330 | ν15 = 64.2 |
| R27 = ∞ | D27 = 0.71 | | |
| R28 = ∞ | D28 = 0.24 | N16 = 1.550000 | ν16 = 60.0 |
| R29 = ∞ | D29 = 3.54 | N17 = 1.589130 | ν17 = 61.2 |
| R30 = ∞ | D30 = 0.42 | N18 = 1.520000 | ν18 = 64.0 |
| R31 = ∞ | | | |

| Variable | Focal Length | | |
|---|---|---|---|
| Separation | 1.00 | 6.15 | 15.43 |
| D5 | 0.16 | 5.31 | 6.76 |
| D13 | 6.90 | 1.76 | 0.31 |
| D20 | 2.99 | 1.95 | 2.96 |

Aspheric Coefficients:

R18: K = 1.71304e + 00   B = −3.52919e − 03   C = 1.32785e − 04
     D = −7.87389e − 05   E = 1.36494e − 05
R21: K = 9.97285e + 00   B = −1.90572e − 03   C = −8.84882e − 05
     D = 3.08971e − 05   E = −5.17678e − 06

Numerical Example 3:

$f = 1\sim16.08$   $Fno = 1.65\sim2.75$   $2\omega = 59.0°\sim4.0°$

| | | | |
|---|---|---|---|
| R1 = 14.556 | D1 = 0.30 | N1 = 1.846660 | ν1 = 23.8 |

TABLE 1-continued

| | | | |
|---|---|---|---|
| R2 = 7.387 | D2 = 0.99 | N2 = 1.603112 | ν2 = 60.7 |
| R3 = −66.855 | D3 = 0.04 | | |
| R4 = 6.636 | D4 = 0.57 | N3 = 1.696797 | ν3 = 55.5 |
| R5 = 17.133 | D5 = Variable | | |
| R6 = 7.155 | D6 = 0.16 | N4 = 1.882997 | ν4 = 40.8 |
| R7 = 1.600 | D7 = 0.65 | | |
| R8 = −5.391 | D8 = 0.14 | N5 = 1.882997 | ν5 = 40.8 |
| R9 = 8.731 | D9 = 0.11 | | |
| R10 = 3.271 | D10 = 0.58 | N6 = 1.846660 | ν6 = 23.8 |
| R11 = −5.348 | D11 = 0.06 | | |
| R12 = −3.464 | D12 = 0.14 | N7 = 1.772499 | ν7 = 49.6 |
| R13 = 21.334 | D13 = Variable | | |
| R14 = Stop | D14 = 0.54 | | |
| R15 = −6.457 | D15 = 0.14 | N8 = 1.772499 | ν8 = 49.6 |
| R16 = 4.445 | D16 = 0.42 | N9 = 1.846660 | ν9 = 23.8 |
| R17 = 60.000 | D17 = 0.51 | | |
| R18* = 7.173 | D18 = 0.85 | N10 = 1.583126 | ν10 = 59.4 |
| R19 = −3.304 | D19 = 0.17 | N11 = 1.846660 | ν11 = 23.8 |
| R20 = −5.362 | D20 = Variable | | |
| R21* = 10.013 | D21 = 0.53 | N12 = 1.583126 | ν12 = 59.4 |
| R22 = −14.510 | D22 = 0.03 | | |
| R23 = 4.830 | D23 = 0.18 | N13 = 1.846660 | ν13 = 23.8 |
| R24 = 2.832 | D24 = 0.92 | N14 = 1.487490 | ν14 = 70.2 |
| R25 = −10.073 | D25 = 0.35 | | |
| R26 = ∞ | D26 = 0.35 | N15 = 1.516380 | ν15 = 64.2 |
| R27 = ∞ | D27 = 0.71 | | |
| R28 = ∞ | D28 = 0.24 | N16 = 1.550000 | ν16 = 60.0 |
| R29 = ∞ | D29 = 3.54 | N17 = 1.589130 | ν17 = 61.2 |
| R30 = ∞ | D30 = 0.42 | N18 = 1.520000 | ν18 = 64.0 |
| R31 = ∞ | | | |

| Variable | Focal Length | | |
|---|---|---|---|
| Separation | 1.00 | 6.21 | 16.08 |
| D5 | 0.16 | 5.41 | 6.89 |
| D13 | 7.04 | 1.80 | 0.32 |
| D20 | 3.36 | 2.28 | 3.35 |

Aspheric Coefficients:

R18: K = 1.70065e + 00   B = −3.71689e − 03   C = 1.29974e − 04
   D = −7.31900e − 05   E = 1.19400e − 05
R21: K = 9.54122e + 00   B = −1.84461e − 03   C = −8.80745e − 05
   D = 2.61881e − 05   E = −4.30759e − 06

Numerical Example 4:

f = 1~16.10   Fno = 1.65~2.67   2ω = 59.0°~4.0°

| | | | |
|---|---|---|---|
| R1 = 14.266 | D1 = 0.30 | N1 = 1.846660 | ν1 = 23.8 |
| R2 = 7.309 | D2 = 1.01 | N2 = 1.603112 | ν2 = 60.7 |
| R3 = −76.889 | D3 = 0.04 | | |
| R4 = 6.599 | D4 = 0.58 | N3 = 1.696797 | ν3 = 55.5 |
| R5 = 17.367 | D5 = Variable | | |
| R6 = 8.250 | D6 = 0.16 | N4 = 1.882997 | ν4 = 40.8 |
| R7 = 1.567 | D7 = 0.67 | | |
| R8 = −6.044 | D8 = 0.14 | N5 = 1.882997 | ν5 = 40.8 |
| R9 = 9.892 | D9 = 0.11 | | |
| R10 = 3.116 | D10 = 0.55 | N6 = 1.846660 | ν6 = 23.8 |
| R11 = −5.918 | D11 = 0.05 | | |
| R12 = −4.064 | D12 = 0.14 | N7 = 1.772499 | ν7 = 49.6 |
| R13 = 10.682 | D13 = Variable | | |
| R14 = Stop | D14 = 0.66 | | |
| R15 = −3.562 | D15 = 0.18 | N8 = 1.772499 | ν8 = 49.6 |
| R16 = −16.115 | D16 = 0.32 | | |
| R17* = 12.110 | D17 = 0.81 | N9 = 1.603112 | ν9 = 60.7 |
| R18 = −3.604 | D18 = Variable | | |
| R19* = 5.099 | D19 = 0.66 | N10 = 1.583126 | ν10 = 59.4 |
| R20 = −27.004 | D20 = 0.30 | | |
| R21 = 12.568 | D21 = 0.18 | N11 = 1.846660 | ν11 = 23.8 |
| R22 = 4.078 | D22 = 0.78 | N12 = 1.487490 | ν12 = 70.2 |
| R23 = −5.659 | D23 = 0.35 | | |
| R24 = ∞ | D24 = 0.35 | N13 = 1.516330 | ν13 = 64.2 |
| R25 = ∞ | D25 = 0.71 | | |
| R26 = ∞ | D26 = 0.24 | N14 = 1.550000 | ν14 = 60.0 |
| R27 = ∞ | D27 = 3.54 | N15 = 1.589130 | ν15 = 61.2 |
| R28 = ∞ | D28 = 0.42 | N16 = 1.520000 | ν16 = 64.0 |
| R29 = ∞ | | | |

TABLE 1-continued

| Variable | Focal Length | | |
|---|---|---|---|
| Separation | 1.00 | 5.98 | 16.10 |
| D5 | 0.16 | 5.37 | 6.84 |
| D13 | 7.01 | 1.81 | 0.34 |
| D18 | 4.16 | 3.15 | 4.19 |

Aspheric Coefficients:

R17: K = 2.56943e + 01  B = −6.08402e − 03  C = −1.11466e − 04
D = −2.83007e − 05  E = 0.00000e + 00
R19: K = 6.27497e − 01  B = −3.50832e − 03  C = 4.82436e − 05
D = −1.48759e − 05  E = 0.00000e + 00

Numerical Example 5:

f = 1~16.08  Fno = 1.65~2.68  $2\omega$ = 59.0°~4.0°

| | | | |
|---|---|---|---|
| R1 = 13.491 | D1 = 0.30 | N1 = 1.846660 | ν1 = 23.8 |
| R2 = 7.108 | D2 = 1.01 | N2 = 1.603112 | ν2 = 60.7 |
| R3 = −156.379 | D3 = 0.04 | | |
| R4 = 6.721 | D4 = 0.58 | N3 = 1.696797 | ν3 = 55.5 |
| R5 = 18.681 | D5 = Variable | | |
| R6 = 8.425 | D6 = 0.16 | N4 = 1.834807 | ν4 = 42.7 |
| R7 = 1.508 | D7 = 0.67 | | |
| R8 = −5.965 | D8 = 0.14 | N5 = 1.834807 | ν5 = 42.7 |
| R9 = 7.802 | D9 = 0.11 | | |
| R10 = 3.066 | D10 = 0.55 | N6 = 1.846660 | ν6 = 23.8 |
| R11 = −7.878 | D11 = 0.05 | | |
| R12 = −4.920 | D12 = 0.14 | N7 = 1.772499 | ν7 = 49.6 |
| R13 = 12.676 | D13 = Variable | | |
| R14 = (Stop) | D14 = 0.67 | | |
| R15 = −3.452 | D15 = 0.18 | N8 = 1.696797 | ν8 = 55.5 |
| R16 = −16.552 | D16 = 0.28 | | |
| R17* = 11.329 | D17 = 0.81 | N9 = 1.583126 | ν9 = 59.4 |
| R18 = −3.550 | D18 = Variable | | |
| R19* = 4.725 | D19 = 0.65 | N10 = 1.583126 | ν10 = 59.4 |
| R20 = −34.150 | D20 = 0.30 | | |
| R21 = 13.584 | D21 = 0.18 | N11 = 1.846660 | ν11 = 23.8 |
| R22 = 3.861 | D22 = 0.78 | N12 = 1.487490 | ν12 = 70.2 |
| R23 = −5.180 | D23 = 0.35 | | |
| R24 = ∞ | D24 = 0.35 | N13 = 1.516330 | ν13 = 64.2 |
| R25 = ∞ | D25 = 0.71 | | |
| R26 = ∞ | D26 = 0.24 | N14 = 1.550000 | ν14 = 60.0 |
| R27 = ∞ | D27 = 3.54 | N15 = 1.589130 | ν15 = 61.2 |
| R28 = ∞ | D28 = 0.42 | N16 = 1.520000 | ν16 = 64.0 |
| R29 = ∞ | | | |

| Variable | Focal Length | | |
|---|---|---|---|
| Separation | 1.00 | 6.07 | 16.08 |
| D5 | 0.16 | 5.42 | 6.90 |
| D13 | 7.06 | 1.81 | 0.33 |
| D18 | 3.63 | 2.63 | 3.67 |

Aspheric Coefficients:

R17: K = 2.18527e + 01  B = −6.25263e − 03  C = −1.88327e − 04
D = −1.78777e − 05  E = 0.00000e + 00
R19: K = 6.43103e − 01  B = −4.14656e − 03  C = 5.29237e − 05
D = −2.13505e − 05  E = 0.00000e + 00

Numerical Example 6:

f = 1~16.10  Fno = 1.65~2.67  $2\omega$ = 59.0°~4.0°

| | | | |
|---|---|---|---|
| R1 = 13.746 | D1 = 0.30 | N1 = 1.846660 | ν1 = 23.8 |
| R2 = 7.190 | D2 = 1.01 | N2 = 1.603112 | ν2 = 60.7 |
| R3 = −111.074 | D3 = 0.04 | | |
| R4 = 6.652 | D4 = 0.58 | N3 = 1.696797 | ν3 = 55.5 |
| R5 = 17.839 | D5 = Variable | | |
| R6 = 8.785 | D6 = 0.16 | N4 = 1.834807 | ν4 = 42.7 |
| R7 = 1.517 | D7 = 0.64 | | |
| R8 = −6.121 | D8 = 0.14 | N5 = 1.882997 | ν5 = 40.8 |
| R9 = 8.341 | D9 = 0.11 | | |
| R10 = 3.088 | D10 = 0.55 | N6 = 1.846660 | ν6 = 23.8 |
| R11 = −7.139 | D11 = 0.05 | | |
| R12 = −4.657 | D12 = 0.14 | N7 = 1.772499 | ν7 = 49.6 |
| R13 = 12.972 | D13 = Variable | | |
| R14 = Stop | D14 = 0.65 | | |
| R15 = −3.626 | D15 = 0.18 | N8 = 1.772499 | ν8 = 49.6 |

TABLE 1-continued

| | | | |
|---|---|---|---|
| R16 = −14.465 | D16 = 0.37 | | |
| R17* = 12.097 | D17 = 0.81 | N9 = 1.583126 | ν9 = 59.4 |
| R18 = −3.671 | D18 = Variable | | |
| R19* = 4.970 | D19 = 0.64 | N10 = 1.583126 | ν10 = 59.4 |
| R20 = −50.896 | D20 = 0.30 | | |
| R21 = 10.878 | D21 = 0.18 | N11 = 1.846660 | ν11 = 23.8 |
| R22 = 3.860 | D22 = 0.80 | N12 = 1.487490 | ν12 = 70.2 |
| R23 = −5.570 | D23 = 0.35 | | |
| R24 = ∞ | D24 = 0.35 | N13 = 1.516330 | ν13 = 64.2 |
| R25 = ∞ | D25 = 0.71 | | |
| R26 = ∞ | D26 = 0.24 | N14 = 1.550000 | ν14 = 60.0 |
| R27 = ∞ | D27 = 3.54 | N15 = 1.589130 | ν15 = 61.2 |
| R28 = ∞ | D28 = 0.42 | N16 = 1.520000 | ν16 = 64.0 |
| R29 = ∞ | | | |

| Variable Separation | Focal Length | | |
|---|---|---|---|
| | 1.00 | 6.00 | 16.10 |
| D5 | 0.17 | 5.40 | 6.88 |
| D13 | 7.05 | 1.81 | 0.33 |
| D18 | 4.03 | 3.03 | 4.07 |

Aspheric Coefficients:

R17: K = 2.27903e + 01   B = −5.62838e − 03   C = −1.18773e − 04
     D = −1.36886e − 05   E = 0.00000e + 00
R19: K = 7.41373e − 01   B = −3.61778e − 03   C = 1.31439e − 05
     D = −1.23548e − 05   E = 0.00000e + 00

Numerical Example 7:

$f = 1 \sim 16.10$   $Fno = 1.65 \sim 2.68$   $2\omega = 59.0° \sim 4.0°$

| | | | |
|---|---|---|---|
| R1 = 13.567 | D1 = 0.30 | N1 = 1.846660 | ν1 = 23.8 |
| R2 = 7.118 | D2 = 1.01 | N2 = 1.603112 | ν2 = 60.7 |
| R3 = −125.995 | D3 = 0.01 | | |
| R4 = 6.654 | D4 = 0.58 | N3 = 1.696797 | ν3 = 55.5 |
| R5 = 18.010 | D5 = Variable | | |
| R6 = 8.678 | D6 = 0.16 | N4 = 1.882997 | ν4 = 40.8 |
| R7 = 1.526 | D7 = 0.64 | | |
| R8 = −5.907 | D8 = 0.14 | N5 = 1.834807 | ν5 = 42.7 |
| R9 = 7.868 | D9 = 0.11 | | |
| R10 = 3.102 | D10 = 0.55 | N6 = 1.846660 | ν6 = 23.8 |
| R11 = −6.652 | D11 = 0.04 | | |
| R12 = −4.703 | D12 = 0.14 | N7 = 1.772499 | ν7 = 49.6 |
| R13 = 13.795 | D13 = Variable | | |
| R14 = Stop | D14 = 0.65 | | |
| R15 = −3.705 | D15 = 0.18 | N8 = 1.772499 | ν8 = 49.6 |
| R16 = −16.327 | D16 = 0.35 | | |
| R17* = 11.960 | D17 = 0.81 | N9 = 1.583126 | ν9 = 59.4 |
| R18 = −3.626 | D18 = Variable | | |
| R19* = 5.020 | D19 = 0.64 | N10 = 1.583126 | ν10 = 59.4 |
| R20 = −54.719 | D20 = 0.30 | | |
| R21 = 10.668 | D21 = 0.18 | N11 = 1.846660 | ν11 = 23.8 |
| R22 = 3.837 | D22 = 0.81 | N12 = 1.487490 | ν12 = 70.2 |
| R23 = −5.488 | D23 = 0.35 | | |
| R24 = ∞ | D24 = 0.35 | N13 = 1.516330 | ν13 = 64.2 |
| R25 = ∞ | D25 = 0.71 | | |
| R26 = ∞ | D26 = 0.24 | N14 = 1.550000 | ν14 = 60.0 |
| R27 = ∞ | D27 = 3.54 | N15 = 1.589130 | ν15 = 61.2 |
| R28 = ∞ | D28 = 0.42 | N16 = 1.520000 | ν16 = 64.0 |
| R29 = ∞ | | | |

| Variable Separation | Focal Length | | |
|---|---|---|---|
| | 1.00 | 5.99 | 16.10 |
| D5 | 0.17 | 5.42 | 6.90 |
| D13 | 7.05 | 1.81 | 0.33 |
| D18 | 4.07 | 3.07 | 4.11 |

Aspheric Coefficients:

R17: K = 2.23235e + 01   B = −5.82580e − 03   C = −1.05814e − 04
     D = −1.52391e − 05   E = 0.00000e + 00
R19: K = 7.55412e − 01   B = −3.56320e − 03   C = 1.14992e − 05
     D = −1.20454e − 05   E = 0.00000e + 00

TABLE 1-continued

Numerical Example 8:

f = 1~16.10　Fno = 1.65~2.68　2ω = 59.0°~4.0°

| | | | |
|---|---|---|---|
| R1 = 14.274 | D1 = 0.30 | N1 = 1.846660 | ν1 = 23.8 |
| R2 = 7.309 | D2 = 1.01 | N2 = 1.603112 | ν2 = 60.7 |
| R3 = −76.524 | D3 = 0.04 | | |
| R4 = 6.599 | D4 = 0.58 | N3 = 1.696797 | ν3 = 55.5 |
| R5 = 17.369 | D5 = Variable | | |
| R6 = 8.182 | D6 = 0.16 | N4 = 1.882997 | ν4 = 40.8 |
| R7 = 1.559 | D7 = 0.67 | | |
| R8 = −6.012 | D8 = 0.14 | N5 = 1.882997 | ν5 = 40.8 |
| R9 = 10.283 | D9 = 0.11 | | |
| R10 = 3.100 | D10 = 0.55 | N6 = 1.846660 | ν6 = 23.8 |
| R11 = −6.133 | D11 = 0.05 | | |
| R12 = −4.154 | D12 = 0.14 | N7 = 1.772499 | ν7 = 49.6 |
| R13 = 10.551 | D13 = Variable | | |
| R14 = Stop | D14 = 0.66 | | |
| R15 = −3.512 | D15 = 0.18 | N8 = 1.772499 | ν8 = 49.6 |
| R16 = −15.411 | D16 = 0.32 | | |
| R17* = 11.773 | D17 = 0.81 | N9 = 1.583126 | ν9 = 59.4 |
| R18 = −3.512 | D18 = Variable | | |
| R19* = 5.060 | D19 = 0.67 | N10 = 1.583126 | ν10 = 59.4 |
| R20 = −25.181 | D20 = 0.30 | | |
| R21 = 13.185 | D21 = 0.18 | N11 = 1.846660 | ν11 = 23.8 |
| R22 = 4.105 | D22 = 0.78 | N12 = 1.487490 | ν12 = 70.2 |
| R23 = −5.634 | D23 = 0.35 | | |
| R24 = ∞ | D24 = 0.35 | N13 = 1.516330 | ν13 = 64.2 |
| R25 = ∞ | D25 = 0.71 | | |
| R26 = ∞ | D26 = 0.24 | N14 = 1.550000 | ν14 = 60.0 |
| R27 = ∞ | D27 = 3.54 | N15 = 1.589130 | ν15 = 61.2 |
| R28 = ∞ | D28 = 0.42 | N16 = 1.520000 | ν16 = 64.0 |
| R29 = ∞ | | | |

| Variable | Focal Length | | |
|---|---|---|---|
| Separation | 1.00 | 6.00 | 16.10 |
| D5 | 0.16 | 5.37 | 6.84 |
| D13 | 7.02 | 1.81 | 0.34 |
| D18 | 4.11 | 3.11 | 4.16 |

Aspheric Coefficients:

R17: K = 2.24174e + 01　B = −6.23144e − 03　C = −1.05546e − 04
　　 D = −1.73115e − 05　E = 0.00000e + 00
R19: K = 5.10561e − 01　B = −3.44827e − 03　C = 4.58683e − 05
　　 D = −1.23288e − 05　E = 0.00000e + 00

Numerical Example 9:

f = 1~14.61　Fno = 1.65~2.53　2ω = 59.0°~4.4°

| | | | |
|---|---|---|---|
| R1 = 14.769 | D1 = 0.30 | N1 = 1.846660 | ν1 = 23.8 |
| R2 = 7.439 | D2 = 0.99 | N2 = 1.603112 | ν2 = 60.7 |
| R3 = −75.427 | D3 = 0.04 | | |
| R4 = 6.741 | D4 = 0.57 | N3 = 1.696797 | ν3 = 55.5 |
| R5 = 17.783 | D5 = Variable | | |
| R6 = 6.595 | D6 = 0.16 | N4 = 1.882997 | ν4 = 40.8 |
| R7 = 1.630 | D7 = 0.65 | | |
| R8 = −4.919 | D8 = 0.14 | N5 = 1.882997 | ν5 = 40.8 |
| R9 = 7.350 | D9 = 0.11 | | |
| R10 = 3.412 | D10 = 0.58 | N6 = 1.846660 | ν6 = 23.8 |
| R11 = −4.519 | D11 = 0.06 | | |
| R12 = −3.099 | D12 = 0.14 | N7 = 1.772499 | ν7 = 49.6 |
| R13 = 51.053 | D13 = Variable | | |
| R14 = (Stop) | D14 = 0.55 | | |
| R15 = −5.958 | D15 = 0.14 | N8 = 1.772499 | ν8 = 49.6 |
| R16 = 4.450 | D16 = 0.42 | N9 = 1.846660 | ν9 = 23.8 |
| R17 = 67.055 | D17 = 0.34 | | |
| R18* = 6.761 | D18 = 0.85 | N10 = 1.583126 | ν10 = 59.4 |
| R19 = −3.017 | D19 = 0.17 | N11 = 1.846660 | ν11 = 23.8 |
| R20 = −4.923 | D20 = Variable | | |
| R21* = 10.622 | D21 = 0.53 | N12 = 1.516330 | ν12 = 64.2 |
| R22 = −12.034 | D22 = 0.03 | | |
| R23 = 4.856 | D23 = 0.18 | N13 = 1.846660 | ν13 = 23.8 |
| R24 = 2.832 | D24 = 0.92 | N14 = 1.516330 | ν14 = 64.2 |
| R25 = −11.264 | D25 = Variable | | |
| R26* = −5.117 | D26 = 0.35 | N15 = 1.516330 | ν15 = 64.2 |
| R27 = −4.790 | D27 = 0.71 | | |
| R28 = ∞ | D28 = 0.24 | N16 = 1.550000 | ν16 = 60.0 |

TABLE 1-continued

| | | | |
|---|---|---|---|
| R29 = ∞ | D29 = 3.54 | N17 = 1.589130 | ν17 = 61.2 |
| R30 = ∞ | D30 = 0.42 | N18 = 1.520000 | ν18 = 64.0 |
| R31 = ∞ | | | |

| Variable | Focal Length | | |
|---|---|---|---|
| Separation | 1.00 | 6.03 | 14.61 |
| D5 | 0.16 | 5.41 | 6.89 |
| D13 | 7.03 | 1.78 | 0.30 |
| D20 | 3.46 | 2.26 | 3.03 |
| D25 | 0.71 | 1.91 | 1.14 |

Aspheric Coefficients:

R18: K = 1.42924e + 00   B = −3.77394e − 03   C = 8.07351e − 05
     D = −4.17413e − 05   E = 8.03871e − 06
R21: K = 1.02571e + 01   B = −1.93447e − 03   C = −8.46904e − 05
     D = 2.46044e − 05    E = −3.54895e − 06
R26: K = 2.07625e − 01   B = −3.08758e − 04   C = 1.00476e − 04
     D = 1.13951e − 05    E = −1.14348e − 05

According to the invention, in the foregoing embodiment thereof, it becomes possible to provide a zoom lens of the rear focus type whose range is as high as more than 15 and whose relative aperture is as large as 1.6 in the F-number, while still permitting the back focal distance to be secured large enough to accommodate an optical element such as the color separation prism or an optical element which is aimed to protect the zoom lens. In addition, the optical performance is maintained stable throughout the entire zooming range and throughout the entire focusing range. Using such an zoom lens, a compact, light weight, high performance video camera of the lens add-on type can be realized.

Another embodiment of the invention in which further improvements are made will be described below.

A zoom lens of the rear focus type according to the present embodiment of the invention comprises, in order from an object side, a first lens unit of positive refractive power, a second lens unit of negative refractive power, a third lens unit of positive refractive power and a fourth lens unit of positive refractive power, the second lens unit being moved axially toward the image side to vary the focal length from the wide-angle end to the telephoto end, and the fourth lens units being moved axially, while depicting a locus convex toward the object side, to compensate for the image shift with zooming. Focusing is performed by moving the fourth lens unit. The fourth lens unit includes a positive first lens, a negative second lens and a positive third lens and has at least one aspheric surface. Letting a focal length of the third lens unit be denoted by $f_3$, focal lengths in the wide-angle end and in the telephoto end of the zoom lens be denoted by $f_W$ and $f_T$, respectively, and an F-number in the wide-angle end of the zoom lens be denoted by $F_{NW}$, and putting $$f_M = \sqrt{f_W \cdot f_T},$$

the following condition is satisfied:

$$3.44 < f_3 \times F_{NW}/f_M < 15.38 \quad (9).$$

Figure 20:
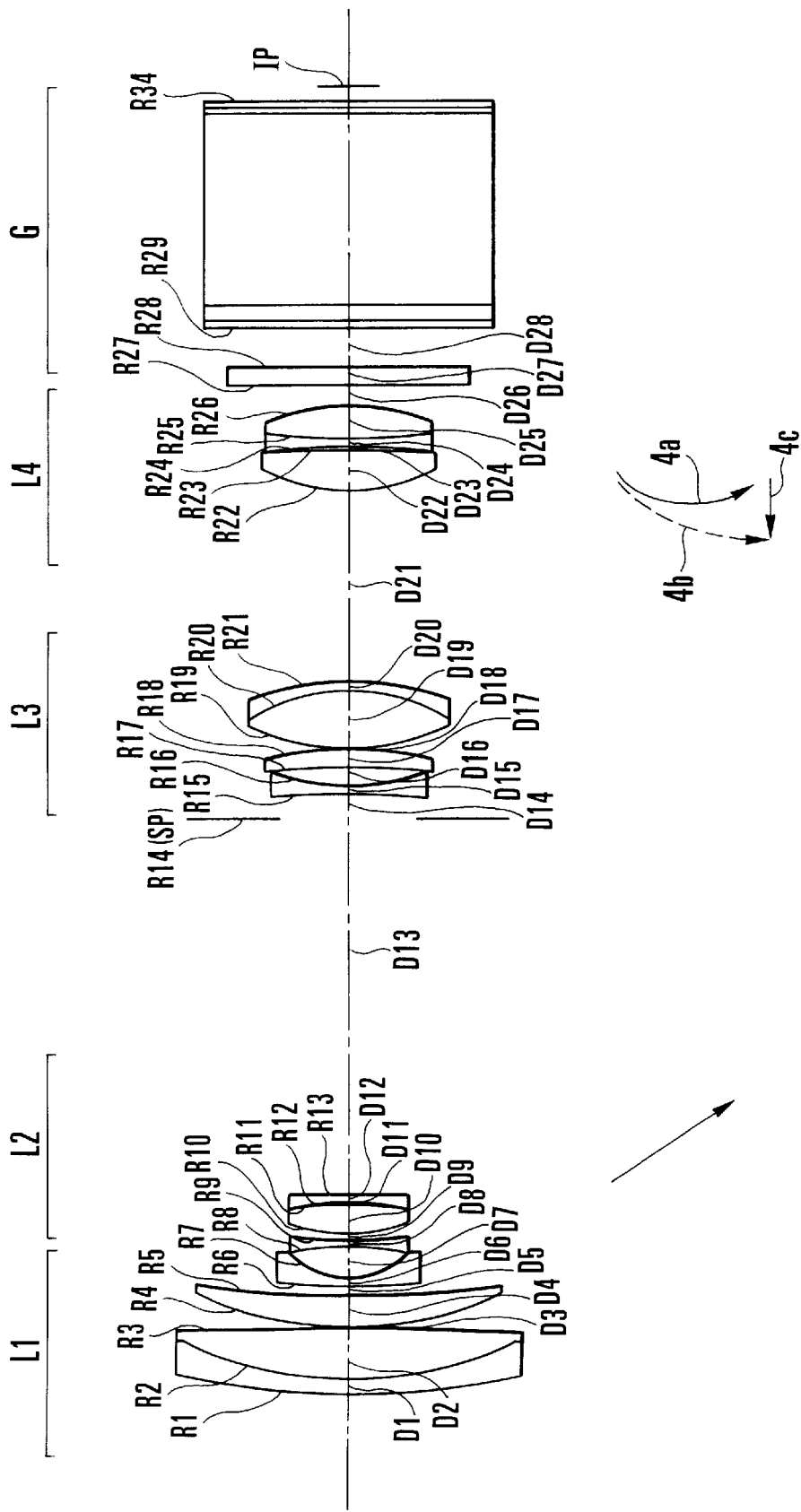
FIG. 20 is a lens block diagram of a numerical example 10 of the invention.
Figure 21:
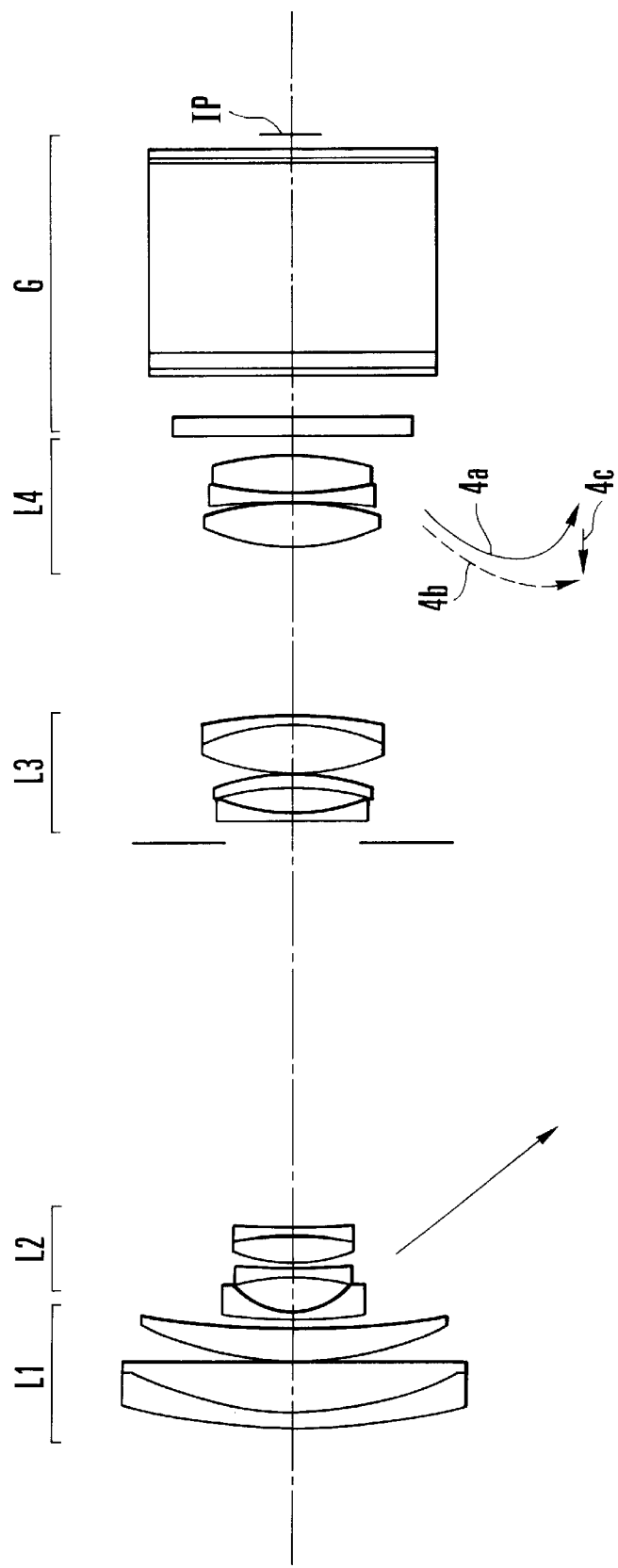
FIG. 21 is a lens block diagram of a numerical example 11 of the invention.
Figure 22:
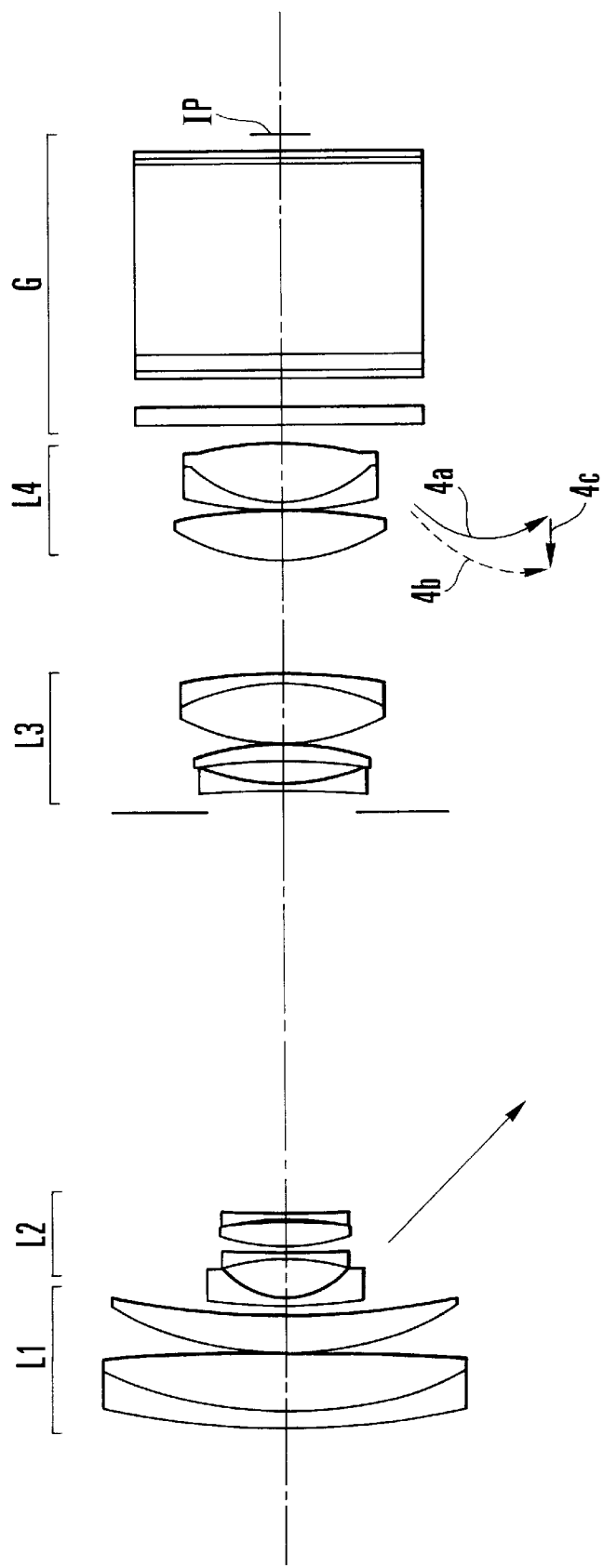
FIG. 22 is a lens block diagram of a numerical example 12 of the invention.

FIGS. 20 to 22 are longitudinal section views of the respective numerical examples 10 to 12 of zoom lenses of the rear focus type according to the present embodiment of the invention. The aberrations of the numerical example 10 are shown in FIGS. 23-1 to 23-4 through FIGS. 25-1 to 25-4. The aberrations of the numerical example 11 are shown in FIGS. 26-1 to 26-4 through FIGS. 28-1 to 28-4. The aberrations of the numerical example 12 are shown in FIGS. 29-1 to 29-4 through FIGS. 31-1 to 31-4. Of the aberration curves, the ones of FIGS. 23-1 to 23-4, FIGS. 26-1 to 26-4 and FIGS. 29-1 to 29-4 are in the wide-angle end, the ones of FIGS. 24-1 to 24-4, FIGS. 27-1 to 27-4 and FIGS. 30-1 to 30-4 are in a middle focal length position, and the ones of FIGS. 25-1 to 25-4, FIGS. 28-1 to 28-4 and FIGS. 31-1 to 31-4 are in the telephoto end.

In the lens block diagrams, reference character L1 denotes a first lens unit of positive refractive power, reference character L2 denotes a second lens unit of negative refractive power, reference character L3 denotes a third lens unit of positive refractive power and reference character L4 denotes a fourth lens unit of positive refractive power. An aperture stop SP is disposed in front of the third lens unit L3. Reference character G denotes a glass block such as a color separation optical system, a face plate or a filter. Reference character IP denotes an image plane.

In the present embodiment, during zooming from the wide-angle end to the telephoto end, the second lens unit moves toward the image side as indicated by the arrow, while simultaneously axially moving the fourth lens unit in a locus convex toward the object side to compensate for the shift of the image plane.

For focusing purposes, the fourth lens unit moves axially. That is, the rear focusing method is employed. When focusing on an object at infinity or at a minimum distance, the fourth lens unit moves in a locus shown in FIG. 20 by a solid line curve 4a or a dashed line curve 4b, respectively, to compensate for the image shift with zooming. It is noted that the first and third lens units remain stationary during zooming and during focusing.

In the present embodiment, the provision for compensating for the image shift with zooming and for focusing is made on the common or fourth lens unit. In particular, as shown by the curves 4a and 4b in FIG. 20, a locus of movement of the fourth lens unit with zooming from the wide-angle end to the telephoto end is made convex toward the object side. This assures efficient utilization of the air space between the third and fourth lens units. The shortening of the total length of the entire system is thus achieved advantageously.

In the present embodiment, with the setting, for example, in the telephoto end, when focusing is performed to suit from an infinitely distant object to closer objects, the fourth lens unit moves toward the object side as shown by a straight line 4c in FIG. 20.

According to the invention, the fourth lens unit is constructed with, in order from an object side, a positive first lens of bi-convex form, a negative second lens of either bi-concave form or meniscus form convex toward the object side, and a positive third lens of bi-convex form, totaling three lenses, and is characterized by satisfying the above condition (9).

By using three lenses in constructing the fourth lens unit as described above, the exit pupil is put to so long a position (distance) that the light beam emerging from the lens system becomes telecentric. As the color separation prism is disposed behind the lens system, the angle at which the light rays enter the color separation prism is made gentler. Under such a condition, color separation is carried out effectively, so that the color reproduction of the image is thus enhanced.

Then, in order to correct the aberrations well when increasing the relative aperture and the range of variation of the focal length, while keeping hold of the back focal distance at a predetermined value, the refractive power (focal length $f_3$) of the third lens unit and the F-number are determined so as to satisfy the condition (9).

The condition (9) regulates the focal length $f_3$ of the third lens unit, and is thus greatly related to the back focal distance.

When the lower limit of the condition (9) is exceeded, as this implies that the F-number $F_{NW}$ in the wide-angle end is too bright, or that the focal length of the third lens unit is too short, it becomes difficult to secure the predetermined value of the back focal distance. Conversely, when the focal length of the third lens unit is made too much longer than the upper limit, or when the F-number $F_{NW}$ in the wide-angle end is too much darker, the back focal distance becomes longer, but the distance between the third lens unit and the fourth lens unit is caused to increase, which in turn causes the total length of the entire lens system to become longer. Therefore, it becomes difficult to improve the compact form.

Other characteristic features of the zoom lens of the rear focus type according to the present embodiment of the invention are described below.

One of the aims of the invention is to extend the zooming range. To this end, it is desirable that the chromatic aberrations that arise from zooming are to be cancelled out in the first and second lens units. Contradictorily to this, the ways the first and second lens units produce lateral chromatic aberration with zooming are greatly different from each other. So, in the wide-angle end, it is liable to incline to over-correction. Therefore, the fourth lens unit is under-corrected for lateral chromatic aberration, so that the chromatic aberrations are kept in balance throughout the extended zooming range.

In this case, for the longitudinal chromatic aberration, when the zoom ratio is small, correction can be done without causing its balance to collapse greatly.

Therefore, it is also possible to make the third lens unit in the form of a positive single lens. However, to aim at much higher a range and much larger a relative aperture simultaneously, as in the invention, the longitudinal chromatic aberration is under-corrected as a whole. So, it becomes difficult to maintain a good stability of optical performance at high level.

On this account, according to the invention, the third lens unit is constructed with a negative first lens, a positive second lens of meniscus form convex toward the image side and at least one cemented or third lens, thereby correcting chromatic aberrations at optimum throughout the extended zooming range. Also, the spherical aberration which has flare components of higher orders is suppressed to a minimum.

In particular, the third lens unit is constructed with a negative first lens either of bi-concave form or of meniscus form convex toward the object side, a positive second lens of meniscus form convex toward the image side, a positive third lens of bi-convex form and a negative fourth lens of meniscus form convex toward the image side. Of these, the third lens and the fourth lens are cemented together to form the cemented lens.

It will be appreciated that, in the invention, the form and the construction and arrangement of the constituent lenses are simple. Nonetheless, the zooming range is increased to as high as 15.5, and the relative aperture is as large as 1.45 to 1.65 in F-number in the wide-angle end. Moreover, high optical performance is maintained stable throughout.

Fundamentally, the cemented form may be adopted in each lens unit. If so, intra-unit decentering can be suppressed effectively, and it is possible to assure uniformity of the quality of the manufactured products. However, this lowers the degree of freedom of the design by one. Therefore, it becomes difficult to attain fulfillment of the initial performance in such a manner that the requirements for the large relative aperture and the compact form of the zoom lens are satisfied.

Accordingly, in the present embodiment, the third lens unit is constructed as described above. Moreover, in the numerical example 10, the convex surface of the strongest refracting power in the third lens unit is formed to aspheric shape such that the positive refractive power becomes progressively weaker toward the marginal zone of the lens, thereby correcting the spherical aberration in the flare components of higher orders. At the same time, the intra-unit decentering is suppressed advantageously. For the zoom lens of even higher precision accuracy, the increase of the relative aperture is thus achieved. Also, in the numerical examples 10 and 12 shown in FIGS. 20 and 22, the fourth lens unit is constructed with inclusion of a cemented lens. As in the third lens unit, there is produced an advantage of suppressing the intra-unit decentering. A zoom lens of even higher precision accuracy is thus achieved.

Further, in the present embodiment, the convex surface of the strongest refracting power in the fourth lens unit is formed to aspheric shape such that the positive refractive power becomes progressively weaker toward the marginal zone of the lens, thereby correcting the spherical aberration and the astigmatism. A zoom lens of even higher precision accuracy is thus attained while maintaining the large relative aperture and the ultra high zoom ratio.

Further, letting focal lengths in the wide-angle end and in the telephoto end of the zoom lens be denoted by $f_W$ and $f_T$, respectively, and overall focal lengths of the first lens unit to the third lens unit in the wide-angle end and in the telephoto end be denoted by $f_{MW}$ or $f_{MT}$, respectively, and putting $$f_M = \sqrt{f_W \cdot f_T}$$

$$f_{AM} = \sqrt{f_{MW} \cdot f_{MT}},$$

the following condition is satisfied:

$$0 < f_M / F_{AM} < 1.0 \tag{10}$$

The factor in the condition (10) represents the degree of convergence of the light beam emerging from the third lens unit. In general, the light beam diverges in passing through the varifocal unit. The method of correcting aberrations for most stability is, therefore, that such a diverged light beam is to be made afocal by the third lens unit. However, if the light beam emerging from the third lens unit is nearly parallel, it would become difficult to shorten the total length of the entire lens system. On this account, the invention sets forth the condition (10). When the condition (10) is satisfied, the third lens unit produces a converging light beam, thus assuring further shortening of the total length of the entire system.

The significance of the inequalities of condition (10) is explained below.

When the lower limit is exceeded, as this means that the light beam becomes divergent, the total length of the lens system becomes longer. In addition, the height of incidence of light on the fourth lens unit becomes higher. Therefore, the bulk and size of the fourth lens unit increase objectionably. When the upper limit is exceeded, as this means that the degree of convergence is too large, it favors improvements of the compact form, but the variation of the aberrations with zooming and focusing is caused to increase. It becomes difficult to do good correction of aberrations over the entire zooming range.

It is noted that, in the embodiment, the upper limit of the condition (10) may be altered to $$0 < f_M/f_{AM} < 0.3 \tag{10a}$$

If so, it becomes easier to make good compromise between the requirements of stabilizing the aberration correction and of shortening the total length of the lens system.

Also, letting the Abbe number of the glass of at least two positive lenses in the fourth lens unit be denoted by vd, the following condition is satisfied:

$$vd > 66.5 \tag{11}$$

The inequality of condition (11) has an aim to correct the variation of chromatic aberrations well, particularly, lateral chromatic aberrations, with zooming. When the condition (11) is violated, the lateral chromatic aberration becomes under-corrected objectionably.

Next, numerical examples 10 to 12 of the invention are shown. The numerical data for the examples 10 to 12 are listed in the tables, where Ri is the radius of curvature of the i-th lens surface, when counted from the first conjugate point, Di is the i-th axial thickness or air separation, when counted from the first conjugate point, and Ni and vi are respectively the refractive index and Abbe number of the glass of the i-th lens element, when counted from the first conjugate point.

It is noted that the last eight surfaces R27 to R34 in the numerical examples 10 and 12, or R28 to R35 in the numerical example 11, define a glass block such as a color separation optical system, a face plate or a filter.

The shape of the aspheric surface is expressed in the coordinates with an X axis in the axial direction and a Y axis in the direction perpendicular to the optical axis, the direction in which light advances being taken as positive, by the following equation:

$$X = \frac{(1/R)Y^2}{1 + \sqrt{1 - (1+K)(Y/R)^2}} + BY^4 + CY^6 + DY^8 + EY^{10}$$

where R is the radius of the osculating sphere, and K, B, C, D and E are the aspheric coefficients.

In the values of the aspheric coefficients, the notation "e-0X" means $10^{-x}$.

The values of the factors in the above-described conditions (9) to (11) for the numerical examples 10 to 12 are listed in Table-2.

Numerical Example 10:

f = 1~15.41   Fno = 1.65~2.65   2ω= 55.9°~4.0°

| | | | |
|---|---|---|---|
| R1 = 14.679 | D1 = 0.30 | N1 = 1.846660 | v1 = 23.8 |
| R2 = 7.315 | D2 = 0.94 | N2 = 1.603112 | v2 = 60.7 |
| R3 = −59.942 | D3 = 0.04 | | |
| R4 = 6.825 | D4 = 0.58 | N3 = 1.696797 | v3 = 55.5 |
| R5 = 20.017 | D5 = Variable | | |
| R6 = 14.839 | D6 = 0.16 | N4 = 1.882997 | v4 = 40.8 |
| R7 = 1.570 | D7 = 0.56 | | |
| R8 = −5.096 | D8 = 0.14 | N5 = 1.882997 | v5 = 40.8 |
| R9 = 7.898 | D9 = 0.11 | | |
| R10 = 3.394 | D10 = 0.55 | N6 = 1.846660 | v6 = 23.8 |
| R11 = −5.130 | D11 = 0.02 | | |
| R12 = −4.356 | D12 = 0.14 | N7 = 1.772499 | v7 = 49.6 |
| R13 = 51.492 | D13 = Variable | | |
| R14 = Stop | D14 = 0.45 | | |
| R15 = −14.996 | D15 = 0.18 | N8 = 1.804000 | v8 = 46.6 |
| R16 = 4.405 | D16 = 0.30 | | |
| R17 = −13.173 | D17 = 0.35 | N9 = 1.603420 | v9 = 38.0 |
| R18 = −6.245 | D18 = 0.03 | | |
| R19* = 4.034 | D19 = 1.08 | N10 = 1.583126 | v10 = 59.4 |
| R20 = −3.337 | D20 = 0.18 | N11 = 1.696797 | v11 = 55.5 |
| R21 = −5.032 | D21 = Variable | | |
| R22 = 3.666 | D22 = 0.71 | N12 = 1.487490 | v12 = 70.2 |
| R23 = −51.198 | D23 = 0.09 | | |
| R24 = −9.824 | D24 = 0.18 | N13 = 1.846660 | v13 = 23.8 |
| R25 = 13.203 | D25 = 0.62 | N14 = 1.487490 | v14 = 70.2 |
| R26* = −3.269 | D26 = 0.35 | | |
| R27 = ∞ | D27 = 0.35 | N15 = 1.516330 | v15 = 64.2 |
| R28 = ∞ | D28 = 0.71 | | |
| R29 = ∞ | D29 = 0.14 | N16 = 1.550000 | v16 = 60.0 |
| R30 = ∞ | D30 = 0.28 | N17 = 1.520000 | v17 = 69.0 |
| R31 = ∞ | D31 = 3.54 | N18 = 1.589130 | v18 = 61.2 |
| R32 = ∞ | D32 = 0.10 | N19 = 1.550000 | v19 = 60.0 |
| R33 = ∞ | D33 = 0.14 | N20 = 1.516330 | v20 = 64.2 |
| R34 = ∞ | | | |

| | Focal Length | | |
|---|---|---|---|
| Variable Separation | W 1.00 | M 7.25 | T 15.41 |
| D5 | 0.17 | 5.71 | 6.76 |
| D13 | 6.89 | 1.35 | 0.30 |
| D21 | 3.53 | 2.55 | 3.50 |

Aspheric Coefficients:

R19: K = 2.178e − 01   B = −2.194e − 03   C = −2.367e − 04
     D = 4.520e − 05   E = −8.647e − 06
R26: K = −4.680e + 00   B = −5.845e − 03   C = 1.788e − 03
     D = −2.926e − 04   E = 3.446e − 05

Numerical Example 11:

f = 1~15.53   Fno = 1.65~2.65   2ω = 55.9°~3.9°

| | | | |
|---|---|---|---|
| R1 = 13.255 | D1 = 0.30 | N1 = 1.846660 | v1 = 23.8 |
| R2 = 6.913 | D2 = 0.92 | N2 = 1.603112 | v2 = 60.7 |
| R3 = −360.605 | D3 = 0.04 | | |
| R4 = 6.814 | D4 = 0.58 | N3 = 1.712995 | v3 = 53.8 |
| R5 = 20.071 | D5 = Variable | | |
| R6 = 11.811 | D8 = 0.16 | N4 = 1.882997 | v4 = 40.8 |
| R7 = 1.523 | D7 = 0.62 | | |
| R8 = −4.581 | D8 = 0.14 | N5 = 1.882997 | v5 = 40.8 |
| R9 = 10.887 | D9 = 0.14 | | |
| R10 = 3.642 | D10 = 0.48 | N6 = 1.846660 | v6 = 23.8 |
| R11 = −6.095 | D11 = 0.01 | | |
| R12 = −6.929 | D12 = 0.14 | N7 = 1.772499 | v7 = 49.6 |
| R13 = 18.541 | D13 = Variable | | |
| R14 = Stop | D14 = 0.40 | | |
| R15 = 46.905 | D15 = 0.18 | N8 = 1.603112 | v8 = 60.7 |
| R16 = 3.987 | D16 = 0.44 | | |

-continued

| | | | |
|---|---|---|---|
| R17 = −5.638 | D17 = 0.27 | N9 = 1.603420 | ν9 = 38.0 |
| R18 = −4.303 | D18 = 0.04 | | |
| R19 = 4.653 | D19 = 0.87 | N10 = 1.603420 | ν10 = 38.0 |
| R20 = −4.356 | D20 = 0.18 | N11 = 1.805181 | ν11 = 25.4 |
| R21 = −9.396 | D21 = Variable | | |
| R22 = 4.019 | D22 = 0.81 | N12 = 1.487490 | ν12 = 70.2 |
| R23 = −6.241 | D23 = 0.03 | | |
| R24 = −14.229 | D24 = 0.18 | N13 = 1.846660 | ν13 = 23.8 |
| R25 = 8.079 | D25 = 0.04 | | |
| R26 = 7.167 | D26 = 0.65 | N14 = 1.487490 | ν14 = 70.2 |
| R27* = −4.952 | D27 = 0.35 | | |
| R28 = ∞ | D28 = 0.35 | N15 = 1.516330 | ν15 = 64.2 |
| R29 = ∞ | D29 = 0.71 | | |
| R30 = ∞ | D30 = 0.14 | N16 = 1.550000 | ν16 = 60.0 |
| R31 = ∞ | D31 = 0.28 | N17 = 1.520000 | ν17 = 69.0 |
| R32 = ∞ | D32 = 3.54 | N18 = 1.589130 | ν18 = 61.2 |
| R33 = ∞ | D33 = 0.10 | N19 = 1.550000 | ν19 = 60.0 |
| R34 = ∞ | D34 = 0.14 | N20 = 1.516330 | ν20 = 64.2 |
| R35 = ∞ | | | |

| | Focal Length | | |
|---|---|---|---|
| Variable Separation | W 1.00 | M 7.46 | T 15.53 |
| D5 | 0.18 | 5.86 | 6.94 |
| D13 | 7.06 | 1.38 | 0.30 |
| D21 | 3.13 | 2.18 | 3.15 |

Aspheric Coefficients:

R27: K = −1.142e + 01   B = −2.587e − 03   C = 1.357e − 03
     D = 2.224e − 05    E = −2.530e − 05

Numerical Example 12:

f = 1~15.56   Fno = 1.45~2.35   2ω = 55.9°~3.9°

| | | | |
|---|---|---|---|
| R1 = 16.744 | D1 = 0.34 | N1 = 1.846660 | ν1 = 23.8 |
| R2 = 8.080 | D2 = 1.04 | N2 = 1.603112 | ν2 = 60.7 |
| R3 = −52.675 | D3 = 0.04 | | |
| R4 = 5.788 | D4 = 0.65 | N3 = 1.712995 | ν3 = 53.8 |
| R5 = 16.145 | D5 = Variable | | |
| R6 = 11.275 | D6 = 0.16 | N4 = 1.882997 | ν4 = 40.8 |
| R7 = 1.652 | D7 = 0.69 | | |
| R8 = −4.456 | D8 = 0.14 | N5 = 1.882997 | ν5 = 40.8 |
| R9 = 23.809 | D9 = 0.11 | | |
| R10 = 3.944 | D10 = 0.50 | N6 = 1.846660 | ν6 = 23.8 |
| R11 = −6.752 | D11 = 0.01 | | |
| R12 = −6.014 | D12 = 0.12 | N7 = 1.774299 | ν7 = 49.6 |
| R13 = 22.181 | D13 = Variable | | |
| R14 = Stop | D14 = 0.35 | | |
| R15 = −75.499 | D15 = 0.16 | N8 = 1.603112 | ν8 = 60.7 |
| R16 = 3.992 | D16 = 0.42 | | |
| R17 = −11.584 | D17 = 0.32 | N9 = 1.603420 | ν9 = 38.0 |
| R18 = −5.605 | D18 = 0.04 | | |
| R19 = 4.523 | D19 = 1.06 | N10 = 1.603420 | ν10 = 38.0 |
| R20 = −4.495 | D20 = 0.16 | N11 = 1.834807 | ν11 = 42.7 |
| R21 = −12.558 | D21 = Variable | | |
| R22 = 3.954 | D22 = 0.87 | N12 = 1.487490 | ν12 = 70.2 |
| R23 = −13.219 | D23 = 0.04 | | |
| R24 = 7.326 | D24 = 0.16 | N13 = 1.846660 | ν13 = 23.8 |
| R25 = 2.531 | D25 = 1.06 | N14 = 1.487490 | ν14 = 70.2 |
| R26 = −6.095 | D26 = 0.35 | | |
| R27 = ∞ | D27 = 0.35 | N15 = 1.516330 | ν15 = 64.2 |
| R28 = ∞ | D28 = 0.53 | | |
| R29 = ∞ | D29 = 0.14 | N16 = 1.550000 | ν16 = 60.0 |
| R30 = ∞ | D30 = 0.28 | N17 = 1.520000 | ν17 = 69.0 |
| R31 = ∞ | D31 = 3.54 | N18 = 1.589130 | ν18 = 61.2 |
| R32 = ∞ | D32 = 0.10 | N19 = 1.550000 | ν19 = 60.0 |
| R33 = ∞ | D33 = 0.14 | N20 = 1.516330 | ν20 = 64.2 |
| R34 = ∞ | | | |

| | Focal Length | | |
|---|---|---|---|
| Variable Separation | W 1.00 | M 7.87 | T 15.56 |
| D5 | 0.17 | 6.17 | 7.32 |
| D13 | 7.43 | 1.43 | 0.28 |
| D21 | 2.16 | 1.22 | 2.20 |

-continued

Aspheric Coefficients:

R26: K = −8.511e + 00   B = 1.358e − 03   C = −3.565e − 04
     D = 3.843e − 04    E = −4.533e − 05

TABLE 2

| Condition | Numerical Example | | |
|---|---|---|---|
| No. | 10 | 11 | 12 |
| (9) | 3.82 | 4.72 | 5.30 |
| (10) | 0.18 | 0.06 | 0.013 |
| (11) | 70.2 | 70.2 | 70.2 |

According to the invention, as applied to the 4-unit form of the zoom lens of the rear focus type, the proper rules of design for the lens units are set forth. It is, therefore, made possible to achieve a large relative aperture, high range zoom lens which is corrected well for performance throughout the entire extended zooming range and throughout the entire focusing range.

What is claimed is:

1. A zoom lens comprising, in order from an object side to an image side, a first lens unit having a positive refractive power, a second lens unit having a negative refractive power, a third lens unit having a positive refractive power, and a fourth lens unit having a positive refractive power, said second lens unit and said fourth lens unit being moved to effect zooming, wherein said third lens unit consists of a negative lens component and a positive lens component disposed closest to the image side, and a lens surface on the image side of said positive lens component has a refractive power which is stronger than that of a lens surface on the object side of said positive lens component, and wherein said zoom lens satisfies the following condition:

$$8.1 < BF \times \sqrt{F_{NM}}/(f_W \times \tan \omega) < 13.3$$

where BF is a distance, when reduced to air, from a last lens surface of said zoom lens to an image plane in a wide-angle end with an object at infinity, and $f_W$, $F_{NW}$ and ω are a focal length, a full aperture F-number and a semiangle of field in the wide-angle end of said zoom lens, respectively.

2. A zoom lens according to claim 1, satisfying the following conditions:

$$1.0 < |R_{31r}/R_{32r}| < 5.0$$

$$1.5 < f_3/f_{32} < 5.0$$

where $R_{31r}$ and $R_{32r}$ are radii of curvature of lens surfaces on the object side and on the image side of said positive lens component, respectively, and $f_{32}$ and $f_3$ are focal lengths of said positive lens component and said third lens unit, respectively.

3. A zoom lens according to claim 1, wherein said positive lens component of said third lens unit is a cemented lens consisting of a lens of positive refractive power and a lens of negative refractive power.

4. A zoom lens according to claim 1, wherein said fourth lens unit is moved to effect focusing.

5. A zoom lens comprising, in order from an object side to an image side, a first lens unit having a positive refractive power, a second lens unit having a negative refractive power, a third lens unit having a positive refractive power and a fourth lens unit having a positive refractive power, said second lens unit and said fourth lens unit being moved to effect zooming, and said third lens unit being designed not to move for zooming, wherein said third lens unit has a negative lens component disposed closest to the object side, and a lens surface on the object side of said negative lens component has a refractive power which is stronger than that of a lens surface on the image side of said negative lens component, and the following condition is satisfied:

$$8.1 < BF \times \sqrt{F_{NW}}/(f_W \times \tan \omega) < 13.3$$

where BF is a distance, when reduced to air, from a last lens surface of said zoom lens to an image plane in a wide-angle end with an object at infinity, and $f_w$, $F_{NW}$ and $\omega$ are a focal length, a full aperture F-number and a semiangle of field in the wide-angle end of said zoom lens, respectively.

6. A zoom lens according to claim 5, satisfying the following conditions:

$$-0.60 < R_{31f}/f_3 < -0.10$$

$$0.30 < R_{31f}/f_{31} < 0.90$$

where $R_{31f}$ is a radius of curvature of a lens surface on the object side of said negative lens component, and $f_{31}$ and $f_3$ are focal lengths of said negative lens component and said third lens unit, respectively.

7. A zoom lens according to claim 5, wherein said third lens unit comprises a cemented lens of positive refractive power.

8. A zoom lens according to claim 5, wherein said fourth lens unit is moved to effect focusing.

* * * * *

UNITED STATES PATENT AND TRADEMARK OFFICE
CERTIFICATE OF CORRECTION

PATENT NO.    : 6,226,130 B1
DATED         : May 1, 2001
INVENTOR(S)   : Hitoshi Mukaiya et al.

It is certified that error appears in the above-identified patent and that said Letters Patent is hereby corrected as shown below:

Column 3,
Line 42, "what is need to do" should read -- that is needed to be done --.

Column 7,
Line 9, "faster," should read -- fast, --.
Line 9, "come" should read -- coma --.

Column 23,
Line 56, "¶ Therefore," should read -- Therefore, --.

Column 28,
Line 42, "$\sqrt{F_{NM}}$" should read -- $\sqrt{F_{NW}}$ --.

Column 29,
Line 4, "power,a" should read -- power, a --.
Line 14, "$\sqrt{F_{NM}}$" should read -- $\sqrt{F_{NW}}$ --.

Signed and Sealed this

Seventh Day of May, 2002

Attest:

Attesting Officer

JAMES E. ROGAN
*Director of the United States Patent and Trademark Office*